US011403573B1

(12) United States Patent
Chapados

(10) Patent No.: US 11,403,573 B1
(45) Date of Patent: Aug. 2, 2022

(54) METHOD AND SYSTEM OF DEMAND FORECASTING FOR INVENTORY MANAGEMENT OF SLOW-MOVING INVENTORY IN A SUPPLY CHAIN

(71) Applicant: JDA Software Group, Inc., Scottsdale, AZ (US)

(72) Inventor: Nicolas Chapados, Montreal (CA)

(73) Assignee: Blue Yonder Group, Inc., Scottsdale, AZ (US)

(*) Notice: Subject to any disclaimer, the term of this patent is extended or adjusted under 35 U.S.C. 154(b) by 619 days.

(21) Appl. No.: 14/729,444

(22) Filed: Jun. 3, 2015

(51) Int. Cl.
G06Q 10/06 (2012.01)
G06Q 10/08 (2012.01)
G06Q 10/04 (2012.01)
G06Q 30/02 (2012.01)

(52) U.S. Cl.
CPC ....... G06Q 10/06315 (2013.01); G06Q 10/04 (2013.01); G06Q 10/087 (2013.01); G06Q 30/0202 (2013.01)

(58) Field of Classification Search
None
See application file for complete search history.

(56) References Cited

U.S. PATENT DOCUMENTS

| 6,151,582 A * | 11/2000 | Huang | G06Q 10/06 705/7.25 |
| 2005/0075949 A1* | 4/2005 | Uhrig | G06Q 10/087 705/28 |
| 2007/0282669 A1* | 12/2007 | Bachman | G06Q 10/063 705/7.25 |
| 2009/0125375 A1* | 5/2009 | Bateni | G06Q 10/04 705/7.31 |
| 2010/0138273 A1* | 6/2010 | Bateni | G06Q 30/02 705/7.31 |
| 2010/0169162 A1* | 7/2010 | Anderson | G06Q 10/10 705/7.31 |
| 2011/0054984 A1* | 3/2011 | Bateni | G06Q 10/087 705/7.31 |
| 2012/0303410 A1* | 11/2012 | Connors | G06Q 10/087 705/7.31 |
| 2013/0018696 A1* | 1/2013 | Meldrum | G06Q 10/06 705/7.27 |

(Continued)

OTHER PUBLICATIONS

Brockett, "Flexible Purchase Frequency Modeling," Feb. 1996, Journal of Marketing Research, pp. 94-107.*

(Continued)

Primary Examiner — Ivan R Goldberg
(74) Attorney, Agent, or Firm — Spencer Fane LLP; Steven J. Laureanti

(57) ABSTRACT

A system and method are disclosed for a supply chain planner to generate a distributional demand forecast for slow-moving inventory in a supply chain. The distributional demand forecast model takes into account explanatory variables and historical sales data to address seasonality and special events and permits sharing of demand information across different stores and stock-keeping units. The supply chain planner performs inference on the explanatory variables and historical sales data to generate process parameters and latent variables. Other embodiments are also disclosed.

17 Claims, 12 Drawing Sheets

(56) References Cited

U.S. PATENT DOCUMENTS

2015/0317653 A1* 11/2015 Ettl .................... G06Q 30/0202
705/7.31

OTHER PUBLICATIONS

Snyder, "Forecasting the intermittent demand for slow-moving inventories: A modelling approach," 2012, International Journal of Forecasting, vol. 28, pp. 485-496.*

Gonzalez, "Laplace Approximation with Gaussian Processes for Volatility Forecasting," 2014, 4th International Workshop on Cognitive Information Processing, IEEE, pp. 1-6 (Year: 2014).*

Brockett, "Flexible Purchase Frequency Modeling," 1996, Journal of Marketing Research, vol. XXXIII, pp. 94-107 (Year: 1996).*

Snyder ("Forecasting the intermittent demand for slow-moving inventories: A modelling approach," 2012, International Journal of Forecasting, vol. 28, pp. 485-496 (Year: 2012).*

Huang, "Real options approach-based demand forecasting method for a range of products with highly volatile and correlated demand," 2009, European Journal of Operations Research, vol. 198, pp. 867-877 (Year: 2009).*

Feng, "Dynamic Inventory-Pricing Control Under Backorder: Demand Estimation and Policy Optimization," 2014, Manufacturing & Service Operations Management, vol. 16, No. 1, pp. 149-160 (Year: 2014).*

Bivand, "Approximate Bayesian inference for spatial econometric models," 2014, Spatial Statistics, vol. 9, pp. 146-165 (Year: 2014).*

Kwan, H. W. On the Demand Distributions of Slow-Moving Items. PhD thesis, University of Lancaster, UK, 1991.

Hilbe, J. M. Negative Binomial Regression. Cambridge University Press, Cambridge, UK, second edition, 2011.

McCabe, B. P., & Martin, G. M. (2005). Bayesian predictions of low count time series. International Journal of Forecasting, 21, 315-330.

Snyder, R. D., Ord, J. K., & Beaumont, A. (2012). Forecasting the intermittent demand for slow-moving inventories: A modelling approach. International Journal of Forecasting, 28, 485-496.

Shenstone, L., & Hyndman, R. J. (2005). Stochastic models underlying Croston's method for intermittent demand forecasting. Journal of Forecasting, 24, 389-402.

Croston, J. D. (1972). Forecasting and stock control for intermittent demands. Operational Research Quarterly, 23, 289-303.

* cited by examiner

METHOD AND SYSTEM OF DEMAND FORECASTING FOR INVENTORY MANAGEMENT OF SLOW-MOVING INVENTORY IN A SUPPLY CHAIN

TECHNICAL FIELD

The disclosure relates generally to a system and method of supply chain planning and operations management and more specifically to inventory management based on forecasted demand of slow-moving products.

BACKGROUND

Proper management and coordination of supply chain inventory requires accurate prediction about the future demand of all products. Some inventory is particularly difficult to predict based on the unpredictability of the quantity of demand, or lumpiness, and the time between non-zero demands, or intermittence. One particular class of products that represent a demand with low lumpiness and high intermittence are termed slow-moving inventory, or slow movers.

Slow-moving inventory represents a large fraction of the total inventory that a retailer must handle. For many retailers, more than 60% of all products are classified as slow-movers. For online retailers, the percentage of slow-moving inventory may be much higher.

Having accurate demand forecasts is crucial to tight inventory control. As with all products, having too few items on hand translates into lost sales, whereas having too many items on hand unnecessarily ties up resources. Supply chain planning for slow movers is notoriously hard with classical inventory replenishment rules, which often manifests into inadequate service levels.

Previous approaches have adopted the point forecast model of Croston (1972). Croston approached the slow-moving supply chain problem as a simple exponential smoothing of two separate time series derived from an underlying demand series: (i) the series of non-zero demands (made up only of periods during which a non-zero demand is observed); and (ii) the series of durations between non-zero demands. Under Croston's approach, the expected demand during the next period is given as the ratio between the two current estimates. This approach, like other traditional approaches, yields point forecasts, without any indication of the dispersion surrounding the forecast. However, the demand for small integer quantities of slow-moving items is not well summarized by these traditional approaches. These shortcomings are undesirable.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Figure 1:
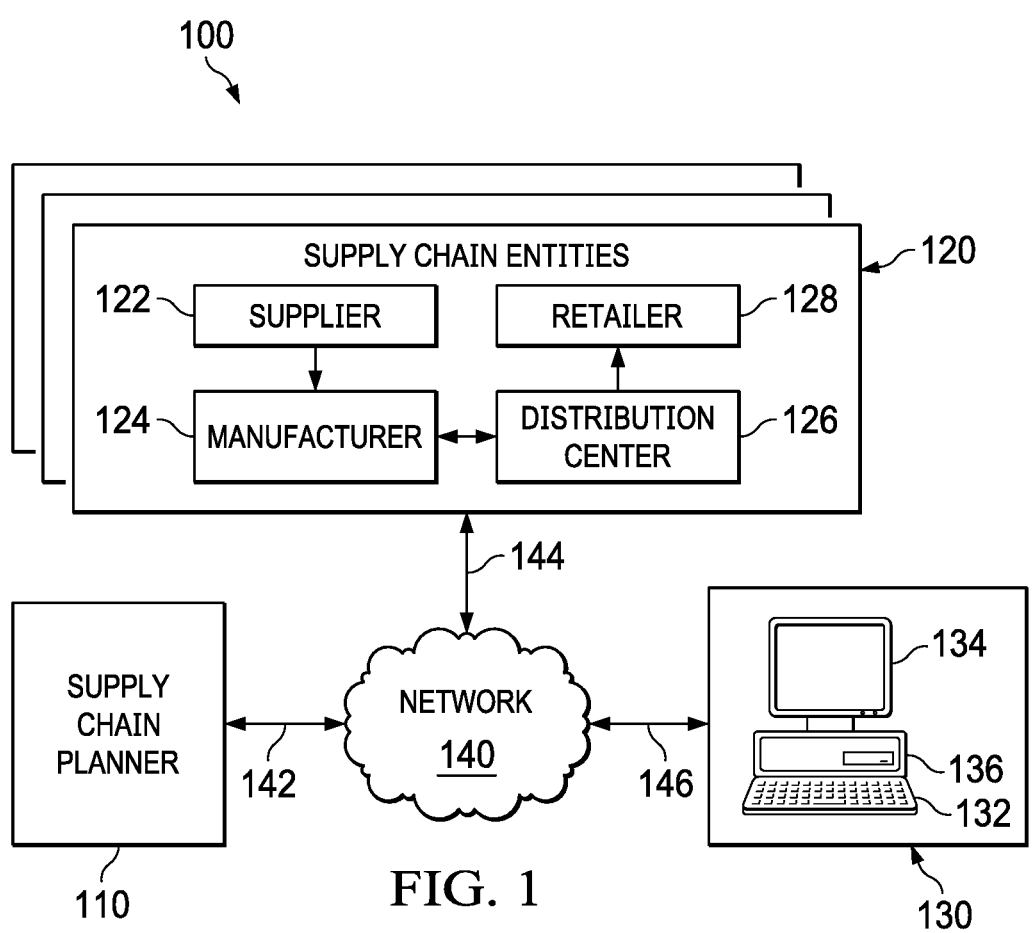
FIG. 1 illustrates an exemplary supply chain network according to a first embodiment.

Methods and systems for inventory management of slow-moving products in a supply chain presented herein are described below in the drawings and detailed description of the invention. Unless specifically noted, it is intended that the words and phrases herein be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that embodiments of the present invention may be practiced without these specific details. In other instances, known structures and devices are shown and/or discussed more generally in order to avoid obscuring the invention. In many cases, a description of the operation is sufficient to enable one of ordinary skill in the applicable art to implement the various forms of the invention. It should be appreciated that there are many different and alternative configurations, devices and technologies to which the disclosed inventions may be applied. The full scope of the present disclosure is not limited to the examples described below.

As described more fully below, aspects of the following disclosure relate to a time series forecasting problem for, what is known in the supply chain planning context as, slow movers. Slow movers, which may refer to slow-moving products, items, or inventory, are characterized by demand with low lumpiness and high intermittence, where lumpiness refers to the unpredictability of the quantity of demand, and intermittence refers to the time between non-zero demands.

Lumpiness of demand conceptually describes the unpredictability of the value of items in a time series. For example, when an observed value is much like one or more previously observed values, the lumpiness is low. When the lumpiness is high, the value of items in the time series varies considerably and/or is unpredictable.

Intermittence of demand conceptually describes how often a non-zero value is observed. For example, when no time or a short time exists between non-zero values in a time series, the intermittence is low. When the intermittence is high, a long time of zero values will exist between non-zero values.

As described above, slow moving inventory is characterized by demand with low to moderate lumpiness and high intermittence. In particular, a representative time series of slow moving inventory may comprise non-negative integer observations that include a large fraction of zero observations characterized by long runs of zeros interspersed by non-zero values. By way of example only and not by way of limitation, a slow-moving product may comprise a product with less than a weekly demand at a retailer.

Lumpiness and intermittence can be expressed quantitatively by use of the variance of demand and the mean time interval between non-zero demands, respectively. Similarly, the squared coefficient of variation ($CV^2$), which is $\sigma^2/m^2$ for a series with mean m and standard deviation $\sigma$, is useful in distinguishing demand patterns for slow-movers. For example, a smooth demand characteristic comprises low intermittence and low squared coefficient of variation. An erratic demand characteristic comprises a high mean non-zero demand value and high squared coefficient of variation. An intermittent demand characteristic comprises a high mean non-zero demand value and a low mean square coefficient of variation; and a lumpy demand characteristic comprises a high mean non-zero demand value and a high mean square coefficient of variation. According to some embodiments, the supply chain planner classifies one or more demands of a supply chain according to these characteristics.

The following disclosure relates to one or more aspects of slow-moving inventory in a supply chain. According to one aspect, a supply chain planner generates a distributional demand forecast for slow-moving products in a supply chain. Distributional forecasts, unlike conventional point forecasts, which yield a single predicted value, generate forecasts of the different distribution for each time period within a planning horizon. For example, an inventory replenishment policy can be directly optimized using the predictive distributions instead of conventional (and often wrong) point assumptions about the distribution. To implement the distributional modeling component, the data is modeled as a zero-inflated negative binomial distribution, wherein the expectation varies with time. The negative binomial is known to be a good model for slow movers. The incorporation of zero inflation allows the model to account for an excess of zeros that can arise from supply chain disruptions. Together, these elements account for many stylized facts of slow mover time series: a non-negative integer nature, overdispersion (fat tails), and an excess of zeros.

According to a second aspect, a supply chain planner generates a supply chain forecast model that takes into account one or more causal factors, input variables, or explanatory variables which may include, but are not limited to, indicators and data of promotions, seasonality, special events (such as sporting events), weather, and the like. Explanatory variables are handled through regression coefficients that locally shift the log-expectation in response to a linear transformation of (known and non-stochastic) explanatory variables.

According to a third aspect, a supply chain planner generates a supply chain forecast model that shares sales and demand information across any one or more dimensions that relate a group of time series, such as, for example: locations, products (such as high-level class to individual Stock Keeping Units (SKUs)), and across channels (such as retail and online). These models can share statistical power across these dimension, such as locations, i.e., stores, such as different locations, such that historical demand patterns in all stores, including responses to explanatory variables, can be learned jointly. This approach allows each store to keep its specificity if sufficient data is available to support that location. Information sharing across a group of related time series is achieved through a hierarchical Bayesian prior over all series-level parameters (particularly regression coefficients). Furthermore, multiple dimensions may be shared, such that the supply chain planner generates a supply chain forecast model based on, for example, the same SKU across different locations, several SKUs that are variants of the same product within the same location, or several SKUs across several locations.

According to a fourth aspect, a supply chain planner solves the forecasting model according to an efficient computational model that, among other things, speeds up computer calculations that predict a distributional forecast generated from millions of data points. The particular forecasting model is efficient enough to be useful in supply chain planning, such as being able to take into account millions of data points and solve the demand problem for slow movers in an efficient amount of time. The series-expected value evolves through a latent autoregressive process of the log-expected value. This process constitutes a mean-reverting first-order autogressive prior on the log-expected demand at each time step. The mean-reverting form of the process is appropriate for long-lifetime slow-movers, for which the long-run expected demand is assumed to not shift significantly from its past levels. The mathematical form of this process constitutes a Gaussian Markov Random Field, for which inference in this case is a nearly linear-time operation in the number of observations.

The following disclosure describes a forecasting method that is effective, efficient, and accurate, especially for slow-movers and aggregating multiple time series with limited data points.

FIG. 1 illustrates an exemplary supply chain network 100 according to a first embodiment. Supply chain network 100 comprises supply chain planner 110, one or more supply chain entities 120, computers 130, a network 140, and communication links 142, 144, and 146.

Although a single supply chain planner 110, one or more supply chain entities 120, a single computer 130, and a single network 140, are shown and described; embodiments contemplate any number of supply chain planners 110, any number of supply chain entities 120, any number of computers 130, or any number of networks 140, according to particular needs.

In a first embodiment, supply chain network 100 generates distributional forecasts of demand for slow-moving inventory of supply chain network 100. In addition, as described below in more detail, supply chain planner 110 generates forecasts based on one or more explanatory variables, permits sharing information across various time series, and comprises an efficient solver of single time series and/or multiple time series in a supply chain planning problem.

In one embodiment, supply chain planner 110 considers various explanatory variables, causal factors, and input variables (hereinafter-referred to as explanatory variables) of one or more supply chain entities 120 when determining a demand forecast. As described below in more detail, these various explanatory variables may be integrated into the supply chain model of one or more supply chain entities 120 to yield more accurate forecasts of demand while improving computational efficiency during a particular planning horizon. In addition, or as an alternative, the various explanatory variables of one or more supply chain entities 120 may include, but are not limited to, indicators and data of promotions, seasonality, special events (such as sporting events), weather, and the like. In response to a forecast, supply chain planner 110 transforms the supply chain of one or more products to meet various types of demand, adhere to product mix or safety stock limits, optimize inventory, maintain specific material or capacity, utilize particular resources, maintain proportional sourcing, reduce use of alternate materials, and/or optimize profit.

Supply chain network 100 may operate on one or more computers 130 that are integral to or separate from the hardware and/or software that support supply chain planner 110 and one or more supply chain entities 120. Computers 130 may include any suitable input device 132, such as a keypad, mouse, touch screen, microphone, or other device to input information. An output device 134 may convey information associated with the operation of supply chain network 100, including digital or analog data, visual information, or audio information. Computers 130 may include fixed or removable non-transitory computer-readable storage media, such as magnetic computer disks, CD-ROM, or other suitable non-transitory computer-readable storage media to receive output from and provide input to supply chain network 100. Computers 130 may include one or more processors 136 and associated memory to execute instructions and manipulate information according to the operation of supply chain network 100.

Although a single computer 130 is shown and described in FIG. 1, supply chain planner 110 and one or more supply chain entities 120 may each operate on separate computers 130 or may operate on one or more shared computers 130. Each of the one or more computers 130 may be a work station, personal computer (PC), network computer, tablets, notebook computer, personal digital assistant (PDA), cell phone, smartphone, telephone, wireless data port, or any other suitable computing device. In an embodiment, one or more users may be associated with supply chain planner 110. These one or more users may include, for example, a "manager" or a "planner" handling generating distributional forecasts and solving single or multiple time series, with or without explanatory variables, and/or one or more related tasks within supply chain network 100. In addition, or as an alternative, these one or more users within supply chain network 100 may include, for example, one or more computers 130 programmed to autonomously handle, among other things, generating a supply chain plan, forecasting a demand based on historical data 222, and adjusting of various levels of manufacturing and inventory and/or one or more related tasks within supply chain network 100.

As an example only and not by way of limitation, one or more supply chain entities 120 may represent one or more supply chain networks, such as, for example, suppliers 122, manufacturers 124, distribution centers 126, retailers 128 (including online retailers) and/or customers. Supplier 122 may be any suitable entity that offers to sell or otherwise provides one or more items (i.e., materials, components, or products) to one or more manufacturers 124. In addition, or as an alternative, each of the one or more items may be represented in supply chain network 100 by an identifier, including, for example, Stock-Keeping Unit (SKU), Universal Product Code (UPC) information, or a barcode, tag, RFID, or any other device that encodes such identifying information.

Manufacturer 124 may be any suitable entity that manufactures at least one product. Manufacturer 124 may use one or more items during the manufacturing process to produce any manufactured, fabricated, assembled, or otherwise processed item, material, component, good or product. In one embodiment, a product represents an item ready to be supplied to, for example, another supply chain entity in one or more supply chain entities 120, such as a supplier, an item that needs further processing, or any other item. Manufacturer 124 may, for example, produce and sell a product to one or more suppliers 122, another manufacturer 124, one or more distribution center 126, one or more retailers 128, a customer, or any other suitable person or entity. Distribution center 126 may be any suitable entity that offers to store or otherwise distributes at least one product to one or more retailers 128 and/or customers. Retailer 128 may be any suitable entity that obtains one or more products to sell to one or more customer, whether as a brick and mortar retailer 128 or an online retailer 128.

Although one or more supply chain entities 120 is shown and described as separate and distinct entities, the same entity may simultaneously act as any one of the one or more supply chain entities 120. For example, one or more supply chain entities 120 acting as manufacturer 124 can produce a product, and the same entity can act as supplier 122 to supply an item to itself or another supply chain entity 120. In addition, or as an alternative, embodiments contemplate any number of suppliers 122, manufactures 124, distribution centers 126 and retailers 128, according to particular needs. Although one example of a supply chain network is shown and described, embodiments contemplate any operational environment and/or supply chain network, without departing from the scope described herein.

In one embodiment, supply chain planner 110 is coupled with network 140 using communications link 142, which may be any wireline, wireless, or other link suitable to support data communications between supply chain planner 110 and network 140 during operation of supply chain network 100. One or more supply chain entities 120 are coupled with network 140 using communications link 144, which may be any wireline, wireless, or other link suitable to support data communications between one or more supply chain entities 120 and network 140 during operation of supply chain network 100. Computers 130 are coupled with network 140 using communications link 146, which may be any wireline, wireless, or other link suitable to support data communications between computers 130 and network 140 during operation of supply chain network 100.

Although communication links 142, 144, and 146 are shown as generally coupling supply chain planner 110, one or more supply chain entities 120, and computers 130 to network 140, supply chain planner 110, one or more supply chain entities 120, and computers 130 may communicate directly with supply chain planner 110, one or more supply chain entities 120, and computers 130, according to particular needs.

In another embodiment, network 140 includes the Internet and any appropriate local area networks (LANs), metropolitan area networks (MANs), or wide area networks (WANs) coupling supply chain planner 110, one or more supply chain entities 120, and computers 130. For example, data may be maintained by supply chain planner 110 at one or more locations external to supply chain planner 110 and one or more supply chain entities 120 and made available to one or more associated users of one or more supply chain entities 120 using network 140 or in any other appropriate manner. Those skilled in the art will recognize that the complete structure and operation of communication network 140 and other components within supply chain network 100 are not depicted or described. Embodiments may be employed in conjunction with known communications networks and other components.

In accordance with the principles of embodiments described herein, supply chain planner 110 generates a distributional demand forecast for slow-moving inventory in supply chain network 100. Supply chain planner 110 further generates a supply chain forecast model that takes into account one or more explanatory variables of supply chain network 100. Furthermore, supply chain planner 110 adjusts the product mix ratios, inventory levels at various stocking points, and proportional or alternative sourcing of one or more supply chain entities 120 based on forecasted demand of inventory based on one or multiple time series.

For example, supply chain inventory may be held at one or more supply chain entities 120. Each of the one or more supply chain entities 120 may hold a mix of inventory that may comprise one or more slow-moving products. In response to a demand occurrence at one or more supply chain entities 120, supply chain planner 110 may generate a distributional demand forecast for the slow-moving inventory in order to resupply the inventory.

Accordingly, supply chain planner 110 generates a distributional forecast for the one or more slow moving products based on one or more explanatory variables and one or more forecasting models described herein.

Figure 2:
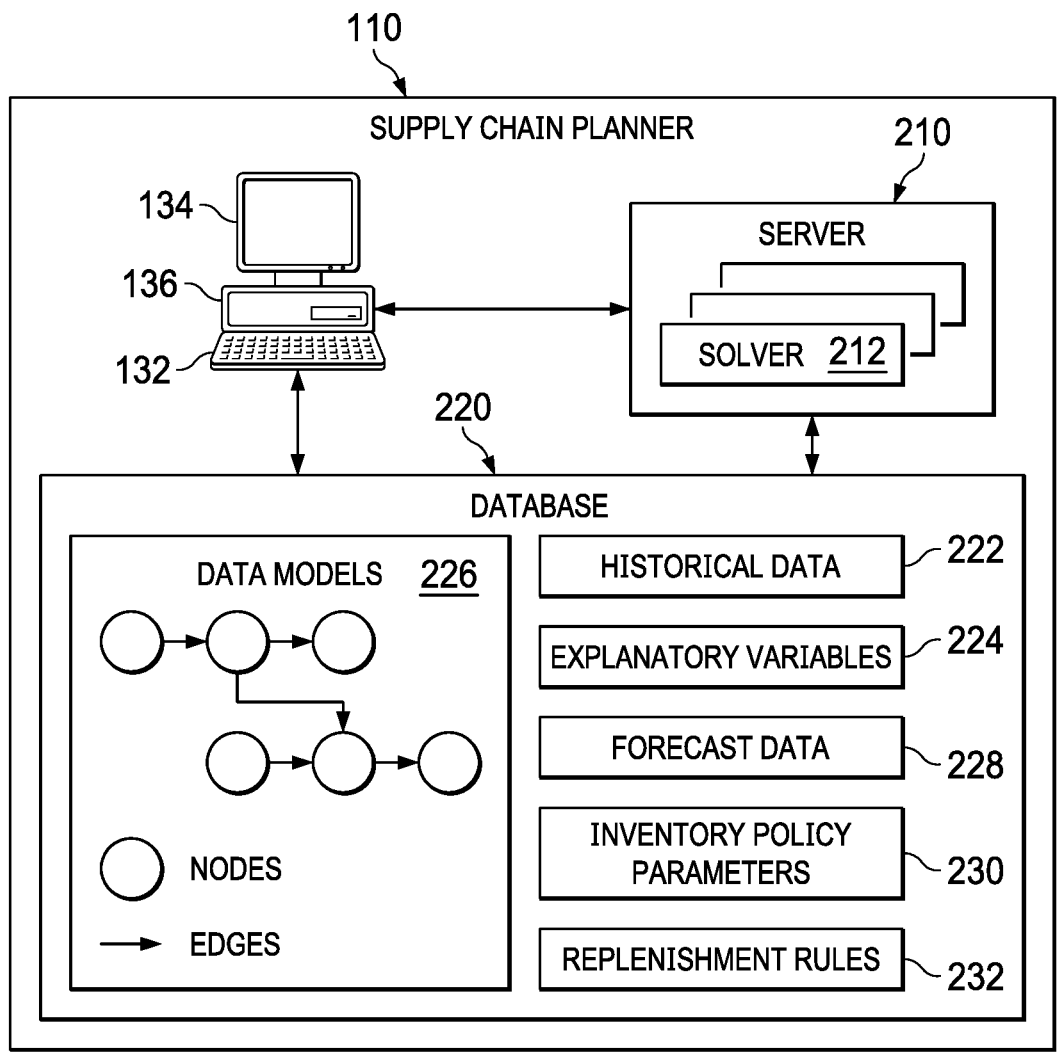
FIG. 2 illustrates the supply chain planner of FIG. 1 in greater detail in accordance with the first embodiment.

FIG. 2 illustrates supply chain planner 110 of FIG. 1 in greater detail in accordance with an embodiment. As discussed above, supply chain planner 110 comprises one or more computers at one or more locations including associated input devices, output devices, non-transitory computer-readable storage media, processors, memory, or other components for receiving, processing, storing, and communicating information according to the operation of supply chain network 100. In an embodiment, supply chain planner 110 stores and retrieves supply chain demand forecast data 228 in database 220. As discussed in more detail below, server 210, which may operate on one or more computers, comprises one or more solvers 212 to generate, among other things, a distributional demand forecast for slow-moving inventory of supply chain network 100. In addition, although server 210 is shown and described as comprising one or more solvers 212; embodiments contemplate any suitable solver or combination of solvers, according to particular needs.

Database 220 comprises one or more databases or other data storage arrangements at one or more locations, local to, or remote from, server 210. Database 220 includes, for example, historical data 222, explanatory variables 224, one or more data models 226, forecast data 228, inventory policy parameters 230, and replenishment rules 232. As an example only and not by way of limitation, database 220 stores supply chain data, including one or more supply chain demand forecast problems of supply chain network 100 that may be used by server 210, and in particular, by one or more solvers 212. Data stored in historical data 222 may be, for example, any data relating to past sales, past demand, purchase data, promotions, events, or the like of one or more supply chain entities 120. Historical data 222 may be stored at time intervals such as, by the minute, hour, daily, weekly, monthly, quarterly, yearly, or any suitable time interval, including substantially in real time.

According to some embodiments, supply chain planner 110 accesses and stores explanatory variables 224 in database 220. Explanatory variables 224 may comprise data relating to specific past, current, or future indicators and data of promotions, seasonality, special events (such as sporting events), weather, and the like.

As discussed in more detail below, supply chain planner 110 models one or more supply chain demand forecast problems of supply chain network 100. That is, one or more solvers 212 of server 210 represents one or more supply chain entities 120 related to one or more supply chain demand forecast problems, in terms of a network of nodes and edges and accesses and stores the data models 226 in database 220. In addition, supply chain network 100, including the one or more supply chain demand forecast problems is valid for a particular period of interest, i.e., a planning horizon.

According to some embodiments, supply chain planner 110 stores forecast data 228 in database 220. Forecast data 228 represents data relating to the distributional demand forecast generated by supply chain planner 110 in response to historical data 222 and explanatory variables 224 according to data models 226. Forecast data 228 may include, for example, future predicted sales, future predicted demand, replenishment quantity of inventory, parameters of the distributional forecasts, and any data or representations of data (such as graphs, charts, tables, matrices, and the like) generated by supply chain planner 110 from historical data 222, according to particular needs.

In one embodiment, where data models 226 comprises a hierarchical Bayesian model with explicit representation of the uncertainty of one or more model quantities, the forecast data 228 comprises the model output. According to this embodiment, the model output comprises a conditional distribution over integer values of demand, which may take the form of a zero-inflated negative binomial, which, for example, has three parameters: mean, tail size, and the zero-inflation parameter. As will be discussed in more detail below, forecasting is done by projecting the latent dynamics of data models 226 into the future by inference. According to some embodiments, forecast data 228 comprises data resulting from the inference process.

According to particular embodiments, inventory policy parameters 230 of database 220 are computed by supply chain planner 110 from a forecasted demand to ensure that a service level of one or more supply chain entities 120 is met with a certain probability. According to some embodiments, the one or more supply chain entities 120 set a service level at 95%, meaning the supply chain entities 120 will set the desired inventory stock level at a level that meets demand 95% of the time. Although the service level is described as being 95%, embodiments contemplate approximately 99% through 90%, or any suitable service level according to particular needs.

Once the service level is set, supply chain planner 110 generates a replenishment order according to one or more replenishment rules 232, which, among other things, indicate to one or more supply chain entities 120 to generate or receive inventory to replace depleted inventory. A replenishment order may indicate to a supplier 122 or distribution center 126 to ship one or more products, a manufacturer 124 to manufacture one or more products, and/or a retailer 128 to receive one or more products to replenish a depleted inventory.

Figure 3:
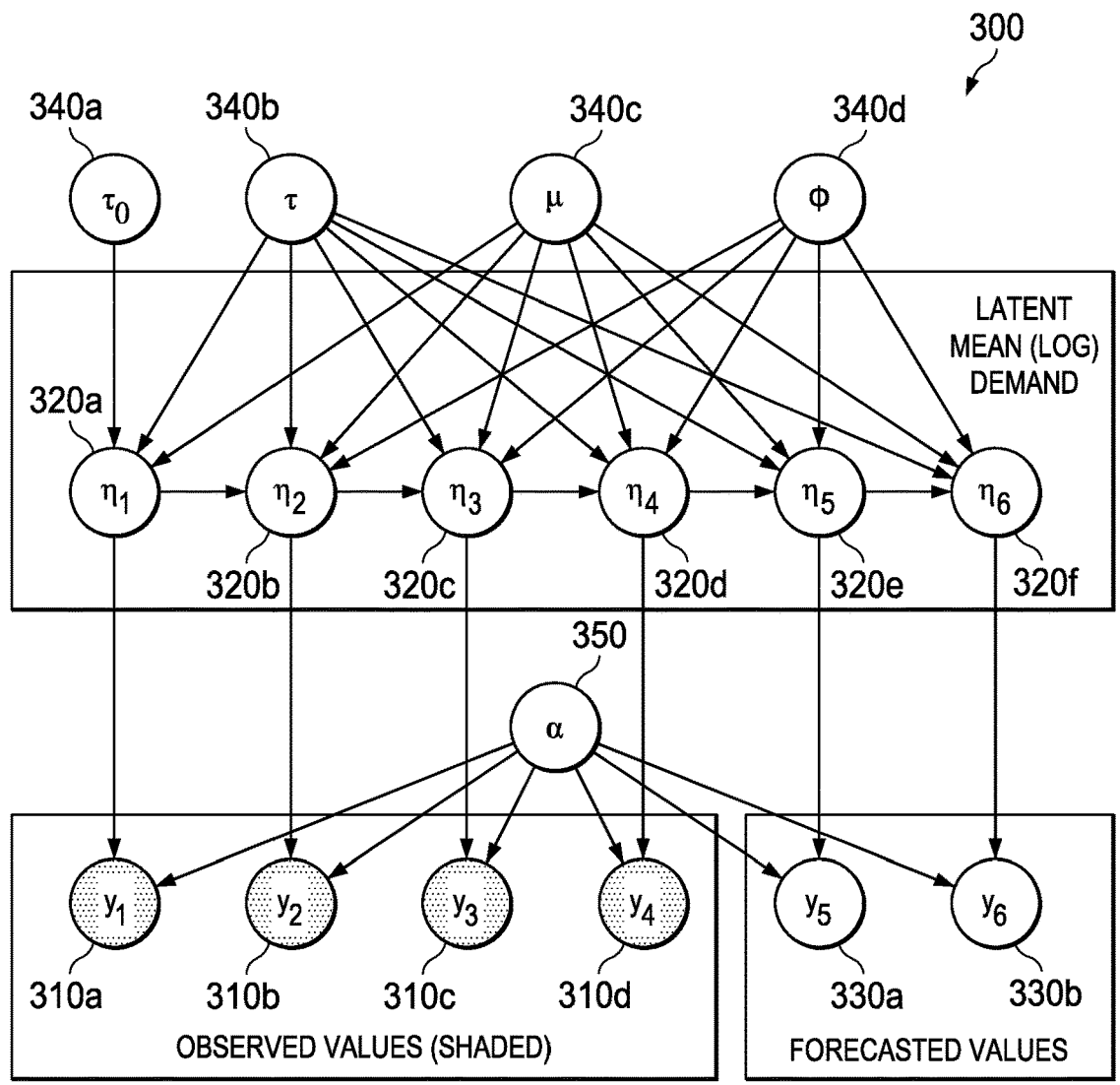
FIG. 3 illustrates an exemplary state-space model in accordance with an embodiment.

FIG. 3 illustrates an exemplary state-space model 300 of a single time series as a fully unfolded directed graphical model. State-space model 300 comprises one or more observed values 310a-310d, one or more latent variables 320a-320f, one or more forecasted values 330a-330b and one or more process parameters 340a-340d. Although one or more observed values 310a-310d, one or more latent variables 320a-320f, one or more forecasted values 330a-330b, and one or more process parameters 340a-340d are shown and described; embodiments contemplate any number of observed values 310a-310d, latent variables 320a-320f, any number of forecasted values 330a-330b or any number of process parameters 340a-340d, according to particular needs.

As will be discussed in more detail below, supply chain planner 110 retrieves time series data from historical data 222 of database 220 and performs an inference over the unobserved model variables, which are represented by one or more latent variables 320a-320f, one or more forecasted values 330a-330b and one or more process parameters 340a-340d in FIG. 3. According to the state-space model 300 where the one or more observed values 310a-310d represent observed demand for a slow-moving item, the one or more latent variables 320a-320f represent the process log-mean, or the log-expected value, of the one or more observed values 310a-310d. According to this model, each observed demand 310a-310d is independent of each other, but the latent variables 320a-320f are conditioned by each preceding latent variable and on one or more process parameters 340a-340d. According to some embodiments, the latent variables 320a-320f may be conditioned by one, two, or any suitable number of preceding latent variables according to particular needs.

Using the process parameters 340a-340d, supply chain planner 110 projects the latent dynamics into the future to obtain a distribution over future values of the latent state, i.e., one or more latent variables 320e-320f ($\eta_5$ and $\eta_6$ in FIG. 3). According to some embodiments, latent variables 320e-320f represent the projected process log-mean or the log-expected value of the forecasted values 330a-330b. Supply chain planner 110 then obtains a predictive distribution over future observations, i.e., one or more forecasted values 330a-330b ($y_5$ and $y_6$ in FIG. 3).

In addition, or as an alternative, each forecasted value 330a-330b is described as a negative binomial distribution with mean $\exp \eta_t$ and size parameter $\alpha$ (which may be independent of t):

$$y_t \sim NB(\exp \eta_t, \alpha) \quad (1)$$

According to some embodiments, size parameter $\alpha$ 350 governs the level of overdispersion where $\alpha > 0$, and, as $\alpha \to \infty$, the negative binomial distribution represented by $y_t$ converges to a Poisson distribution.

According to this demand model, the long-run expected demand for a slow-mover, when projected far in the future, should fall back to a constant level in spite of any past transient disturbances. The latent dynamics of this simplified supply chain demand model can be expressed as an AR(1) (autoregressive of order 1) process with normal innovations, with:

$$\eta_1 = \mu + \varepsilon_1,$$

$$\eta_t = \mu + \phi(\eta_{t-1} - \mu) + \varepsilon_t, \ t > 1$$

$$\varepsilon_1 \sim \mathcal{N}(0, 1/\tau_0 + 1/\tau),$$

$$\varepsilon_t \sim \mathcal{N}(0, 1/\tau), \ t > 1 \quad (2)$$

where $\mu \in \mathbb{R}$ is the long-run level of mean reversion, $-1 < \phi < 1$ is the speed of mean reversion, $\tau > 0$ is the precision of the process innovations, and $\tau_0 > 0$ allows for additional variance in the initial period. All $\varepsilon_t$ are assumed mutually independent. According to some embodiments, the latent dynamics of the simplified supply chain demand model are expressed as an autoregressive of order 2, of order 3, or any suitable order according to particular needs.

According to some embodiments, process parameter $\phi$ 340d i.e. the speed of mean reversion takes values from $-1$ to 1. According to other embodiments, slow-movers are characterized by process parameter $\phi$ 340d taking values from 0 to 1.

Figure 4:
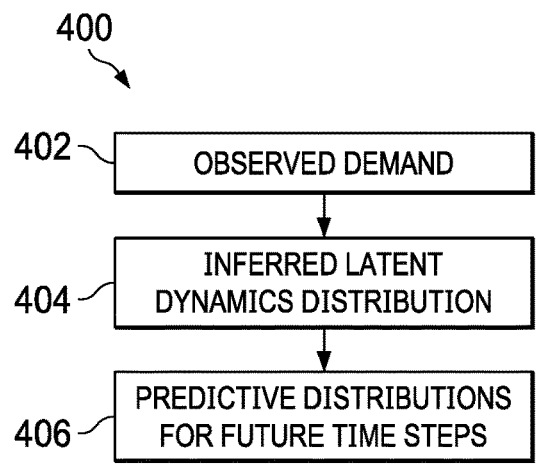
FIG. 4 illustrates an exemplary method of a mean-reverting process of the state-space model of FIG. 3.

FIG. 4 illustrates an exemplary method of a mean-reverting process 400 of state-space model 300. Mean-reverting process 400 proceeds by one or more activities, which although described in a particular order may be performed in one or more permutations, according to particular needs.

The method begins at activity 402, where supply chain planner 110 receives one or more observed values 310a-310d for a time series of demand from historical data 222 and performs an inference over all unobserved supply chain model variables (i.e., one or more latent variables 320a-320f, one or more forecasted values 330a-330b and one or more process parameters 340a-340d of FIG. 3). According to some embodiments, one or more observed values 310a-310d represent non-negative, integer observations of demand for one or more slow-movers comprising many long-run values of zero demand interspersed by non-zero values. For example, as explained above, slow-movers are characterized by low lumpiness and high intermittence. Activity 402, receives observed values 310a-310d of a slow-mover, models the observed values according to FIG. 3, and performs an inference on all unobserved supply chain model variables (i.e. latent variables 320a-320f, size parameter $\alpha$ 350, and process parameters 340a-340d).

At activity 404, supply chain planner uses the unobserved supply chain model variables to obtain a distribution over future values of one or more latent variables, such as 320e-320f ($\eta_5$ and $\eta_6$) of FIG. 3. According to some embodiments, where the one or more observed values 310a-310d comprise the measured demand of one or more slow-movers, the distributions over future values of one or more latent variables 320e-320f comprise a process predicted log-mean distribution.

At activity 406, supply chain planner uses the determined distributions for the one or more forecasted latent variables to determine one or more forecasted values 330a-330b ($y_5$ and $y_6$ of FIG. 3). According to some embodiments, where the one or more observed values 310a-310d comprise the measured demand of one or more slow-movers, the forecasted values 330a-330b correspond to a forecasted distribution of probabilities of integer values of demand for one or more time steps into the future. As an example only and not by way of limitation, supply chain planner 110 outputs a probability distribution of one or more (or all) possible outcomes each weighted by a probability that each outcome will occur. Specifically, the output may comprise a probability of 30% that the demand at the forecasted future time step will be 1, 20% that the demand will be 2, 10% that the probability will be 3, and so forth, up to a predetermined value, or to infinity. According to an embodiment, the sum of all probabilities associated with a forecasted demand at a time step will be equal to 100%.

In addition, although, FIG. 4 illustrates one embodiment of a method of a mean-reverting process of state-space model 300 of supply chain network 100, various changes may be made to method 400 without departing from the scope of embodiments of the present invention.

Figure 5:
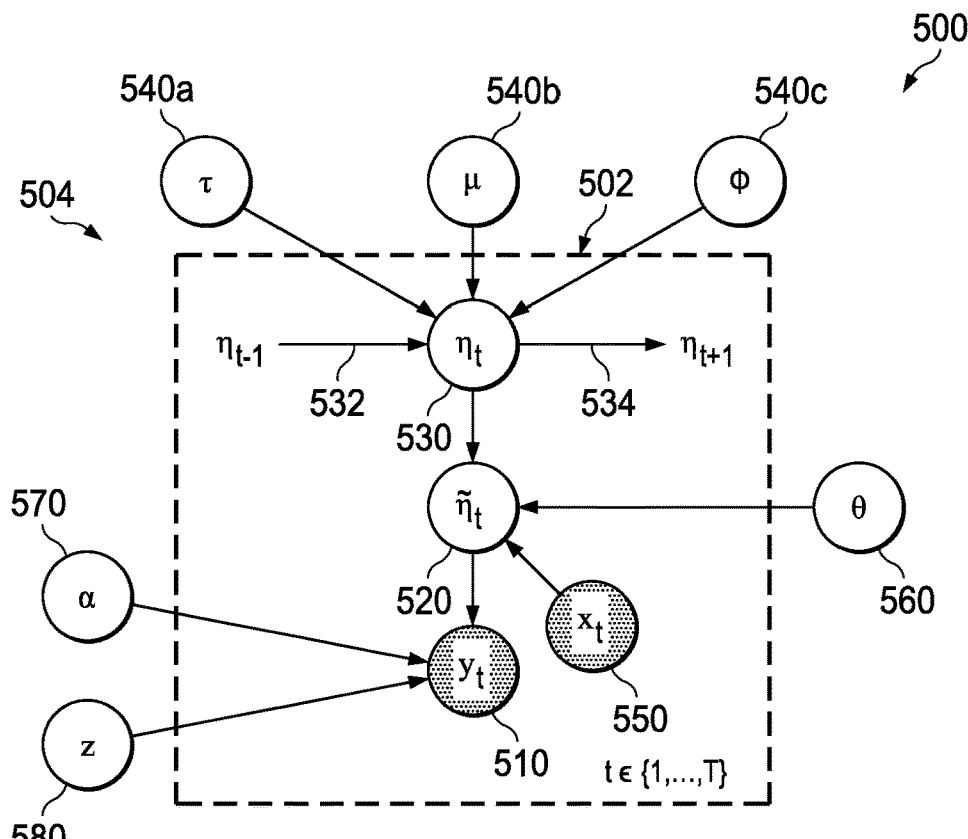
FIG. 5 illustrates an exemplary plate notation model of a latent process mean shifted by explanatory variables for a single time series.

FIG. 5 illustrates a plate notation model 500 for a latent-process mean shifted by explanatory variables for a single time series. The plate notation model 500 comprises an inner plate 502 that indicates the repetition of variables inside inner plate 502 and an outer area 504 outside the inner plate 502 that indicates the non-repetition of variables in the outer area 504. Arrows of the plate model 500 indicate dependency between variables.

Plate notation model 500 comprises an observed value $y_t$ 510, that is conditioned by an effective latent variable $\tilde{\eta}_t$ 520, which is, in turn, conditioned by a latent variable 530, observed explanatory variable 550, and regression coefficient 560. Latent variable 530 is conditioned by a prior latent variable 532 and one or more process parameters 540a-540c. Latent variable 530 conditions a subsequent latent variable 534. Observed value 510 is likewise conditioned by size parameter 570 and zero-inflation parameter 580. Plate notation model 500 indicates repetition of the model across multiple time periods t where variables inside inner plate 502 indicate changing values for each variable for each time period t, and variables in the outer area 504 are shared across multiple time periods t.

According to some embodiments, plate notation model 500 includes an initial and future latent log-intensity, but these are omitted from FIG. 5 solely for clarity of illustration. For example, observed value 510 represents unobserved values 330a-330b over the forecasting horizon and would therefore be unshaded, but this is omitted solely for clarity.

Although an observed value 510, an effective latent variable 520, a latent variable 530, a prior latent variable 532, a subsequent latent variable 534, one or more process parameters 540a-540c, an explanatory variable 550, a regression coefficient 560, a size parameter 570, and a zero-inflation parameter 580 are shown and described, embodiments contemplate any number of observed values 510, effective latent variables 520, latent variables 530, prior latent variables 532, subsequent latent variables 534, process parameters 540a-540c, explanatory variables 550, regression coefficients 560, size parameters 570, and zero-inflation parameters 580 according to particular needs.

According to an embodiment, observed value $y_t$ 510 comprises an observed demand at a time t for one or more slow moving products. According to some embodiments, explanatory variables 550 of plate notation model 500 represent one or more local forcing terms that temporarily shift the location of effective latent variable 520. According to these embodiments, it is assumed that explanatory variables 550 at period, t, $x_t \in \mathbb{R}^N$, are always observed, non-stochastic and known ahead of time (so that future values of $\{x_t\}$ are known over the forecasting horizon). Explanatory variables are linearly combined through regression coefficients θ 560 to additively shift the latent variable $\eta_t$ 530, yielding an effective latent variable (log-mean) $\tilde{\eta}_t$ 520 according to Equation 3:

$$\tilde{\eta}_t = \eta_t + x'_t \theta \quad (3)$$

where the $\{\tilde{\eta}_t\}$ follows the same autoregressive process depicted in FIG. 3. In addition, or as an alternative, extra unconditional mass is added at zero to yield a zero-inflated negative binomial observation model to account for out-of-stock items or supply chain disruptions in a retail store context according to Equation 4:

$$y_t \sim z\delta_0 + (1-z)NB(\exp \tilde{\eta}_t, \alpha) \quad (4)$$

where $\delta_0$ represents unit probability mass at zero and $z \in [0,1]$ is the probability of structural zero. According to some embodiments, the model assumes a Beta(½, ½) prior for z, however embodiments contemplate any suitable prior according to particular needs. According to some embodiments, use of the zero-inflated negative binomial yields additional flexibility in characterizing the fraction of the time in which zero demand is observed in historical data.

Figure 6:
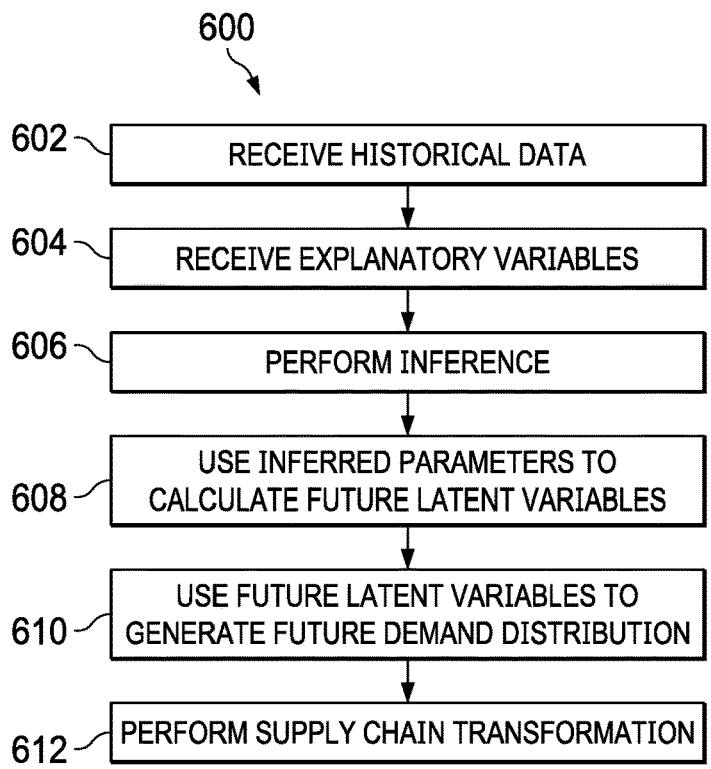
FIG. 6 illustrates an exemplary method of solving a single time series with explanatory variables of the plate notation of FIG. 5.

FIG. 6 illustrates an exemplary method 600 of solving a single time series with explanatory variables of the plate notation of FIG. 5. Solving a single time series with explanatory variables proceeds by one or more activities, which although described in a particular order may be performed in one or more permutations, according to particular needs.

The method begins at activity 602, where supply chain planner 110 receives observed values 510 for a time series of demand from historical data 222. At activity 604, supply chain planner 110 receives explanatory variables 550. According to some embodiments, the value taken on by the explanatory variables 550 depends on the date of the observation. For example, at a time t, supply chain planner 110 calculates the values of the vector $x_t$ in Equation 3 using regressors. For example, in a supply chain planning context, historical data 222 commonly comprises weekly data over a short period of time, and the explanatory variables 550 are calculated using 12 monthly regressors where month i takes the value 1 if the date t falls during month i, and all other regressors take the value 0. Next, supply chain planner 110 smoothes out these regressors by progressive transitioning and/or low-pass filtering.

According to progressive transitioning, instead of abruptly changing from one month to the next, seasonal regressors are modeled to transition progressively by setting the highest intensity for the regressor at month i to be defined to occur on the 15$^{th}$ day of the month where it takes the value of 1, and any distance from the 15$^{th}$ day causes a linear blend with the adjacent month in such a way that the two adjacent months get a share of the total.

As an example only and not by way of limitation, assuming a date t, and k being the month index of this date, $t^{15}$ is the date of the 15$^{th}$ of the same month as t, and $t_\leftrightarrow^{15}$ is the date of the 15$^{th}$ of the adjacent month closest to t, or ∅ if t falls on the 15$^{th}$ of the month. Further, assuming $k_\leftrightarrow$ is the month index of $t_\leftrightarrow^{15}$ or ⊥ if $t_\leftrightarrow^{15}=\emptyset$, then the value of the raw seasonal regressors $\tilde{x}_{t,i}, i \in \{1, \ldots, 12\}$ are given by Equation 5:

$$\tilde{x}_{t,i} = \begin{cases} 1 - \min\left(\frac{|d|}{30}, 1\right), & \text{if } i = k, \\ \min\left(\frac{|d|}{30}, 1\right), & \text{if } i = k_\leftrightarrow, \\ 0, & \text{otherwise.} \end{cases} \quad (5)$$

According to some embodiments, supply chain planner 110 low-pass filters the raw regressors given by Equation 5. According to some embodiments, the low-pass filter may comprise a length-10-finite-impulse response filter. Embodiments contemplate any suitable filter including, an FIR filter of any suitable length, an infinite impulse response filter, or a nonlinear filter, according to particular needs. Assuming $w \in [0,1]$ is the normalized filter cutoff frequency, where 1 represents the Nyquist frequency, then lower values of smoothing constant ω indicate more smoothing. Further, assuming $\xi_\omega$ represents the finite impulse response filter, and ⊗ denotes the circular convolution operation, then the final seasonal regressors are given by Equation 6:

$$x_t = \tilde{x}_t \otimes \xi_\omega, \quad (6)$$

According to some embodiments, ω=0.25 is used. In addition, or as an alternative, where the filtering operations introduce coupling across the regressors, the corresponding regression coefficients (θ in Equation 3) cannot be interpreted as marginal monthly effects. Instead, to recover seasonality effects across a date range (for example, a year), supply chain manager 110 computes regressors for the corresponding dates according to Equation 6 and multiplying by θ.

At activity 606, supply chain planner 110 performs an inference over all unobserved supply chain model variables (clear nodes of FIG. 5). According to an embodiment, observed values 510 represent non-negative, integer observations of demand for a slow-movers and the inference process generates values for all unobserved supply chain model variables (i.e. effective latent variable 520, latent variable 530, process parameters 540a-540c, regression coefficients 560, size parameter 570, and zero-inflation parameter 580).

Supply chain planner 110 performs an inference by a Gaussian approximation of all unobserved supply chain model variables at their posterior mode, which yields near-optimal performance at extremely attractive computational cost compared to traditional methods. The computation is greatly improved by this model because important latent variables (such as $\{\mu, \eta_t\}$) have a conditionally normal prior; their posterior is nearly always close to normality despite the non-linear likelihood.

In order to perform inference, supply chain planner 110 utilizes a Laplace approximation by calculating the log-posterior probability up to an additive constant, $$\log P(\Theta|Y) = \log P(\Theta) + \log P(Y|\Theta) + C, \quad (7)$$

where $Y = \{y_{l,t}\}_{t=1}^{T-h}$ is the set of all observed series values in all groups and C is an unknown and unimportant constant. The log-likelihood term log P (Y|Θ) is derived straightforwardly from the observation model, Equation 4, above, along with the negative binomial probability distribution, Equation 8:

$$P_{NB}(y|\mu,\alpha) = \binom{\alpha+y-1}{\alpha-1}\left(\frac{\alpha}{\mu+\alpha}\right)^\alpha \left(\frac{\mu}{\mu+\alpha}\right)^y. \quad (8)$$

According to these embodiments, the first term, the log-prior, decomposes into global-level and observation-level terms:

$$\log P(\Theta) = \log P(\Theta_G) + \log P(\mu) + \log P(\{\eta_t\}_{t=1}^T | \Theta_G, \mu) \quad (9)$$

where $\Theta_G = \{z, \alpha, \tau, \phi, \theta\}$, and $P(\{\eta_t\}_{t=1}^T | \Theta_G, \mu)$ represents a prior over jointly normally-distributed variables with a highly structured and very sparse precision matrix, a Gaussian Markov random field, and can be computed from Equation (2).

For the single time series process, assuming that the initial $\eta_1$ has the long-run process distribution with precision of $1/(\tau(1-\phi^2))$, the joint prior over the latent process $\{\eta_t\}$ along with normally-distributed long-run mean $\mu$ (having prior precision $\tau_\mu$) is normally distributed with a tridiagonal precision matrix Q, except for the last row and column (corresponding to $\mu$), that follows the pattern:

$$Q = \begin{bmatrix} \tau & -\tau\phi & 0 & 0 & 0 & \tau\bar{\phi} \\ -\tau\phi & \tau(\phi^2+1) & \ddots & 0 & 0 & -\tau\bar{\phi}^2 \\ 0 & -\tau\phi & \ddots & -\tau\phi & 0 & \vdots \\ 0 & 0 & \ddots & \tau(\phi^2+1) & -\tau\phi & -\tau\bar{\phi}^2 \\ 0 & 0 & 0 & -\tau\phi & \tau & \tau\bar{\phi} \\ \tau\bar{\phi} & -\tau\bar{\phi}^2 & \cdots & -\tau\bar{\phi}^2 & \tau\bar{\phi} & \tau_\mu\tau\phi_\tau \end{bmatrix}, \quad (10)$$

where $\bar{\phi} \equiv \phi$ and $\psi_T \equiv T - 2(T-1)\phi + (T-2)\phi^2$, where T is the number of observations. The determinant of the matrix is $\tau^T \tau_\mu (1-\phi^2)$. As indicated earlier, the sparsity of Q permits supply chain planner 110 to quickly compute the process prior term.

At activity 608, supply chain planner 110 uses the determined unobserved supply chain model variables to obtain a distribution over future values of one or more latent variables, such as subsequent latent variable 534 of FIG. 5.

At activity 610, supply chain planner 110 uses the determined distributions for the one or more forecasted latent variables to generate one or more forecasted values of demand. That is, where the one or more observed values 510 comprise the measured demand of one or more slow-movers, the forecasted values of demand correspond to a forecasted distribution of probabilities of integer values of demand for one or more time steps into the future. For example, according to some embodiments, the supply chain planner outputs a probability distribution of one or more (or all) possible outcomes weighted by one or more probabilities that each outcome will occur. Specifically, the output may comprise a probability of 30% that the demand at the forecasted future time step will be 1, 20% that the demand will be 2, 10% that the probability will be 3, and so forth, up to a predetermined value, or to infinity. According to an embodiment, the sum of all probabilities associated with a forecasted demand at a time step will be equal to 100%.

At activity 612, supply chain planner 110 performs a supply chain transformation by, for example, adjusting one or more product mix ratios, inventory levels at various stocking points, and proportional or alternative sourcing of one or more supply chain entities 120 based, at least in part, on the demand forecast. According to some embodiments, supply chain planner 110 performs the supply chain transformation based on the demand forecast and one or more business constraints, bounds, coefficients, changes, order of operations, goals, objectives, and the like of one or more supply chain entities. According to some embodiments, the business constraints, goals and objectives of one or more supply chain entities 120 may include, but are not limited to, meeting various types of demand, adhering to product mix or safety stock limits, minimizing inventory, maintaining specific material or capacity, utilizing particular resources, maintaining proportional sourcing, reducing use of alternate materials, optimizing profit, and the like.

In addition, although, FIG. 6 illustrates one embodiment of a method 600 of a solving a single time series with explanatory variables of plate notation model 500 of supply chain network 100, various changes may be made to method 600 without departing from the scope of embodiments of the present invention.

Figure 7:
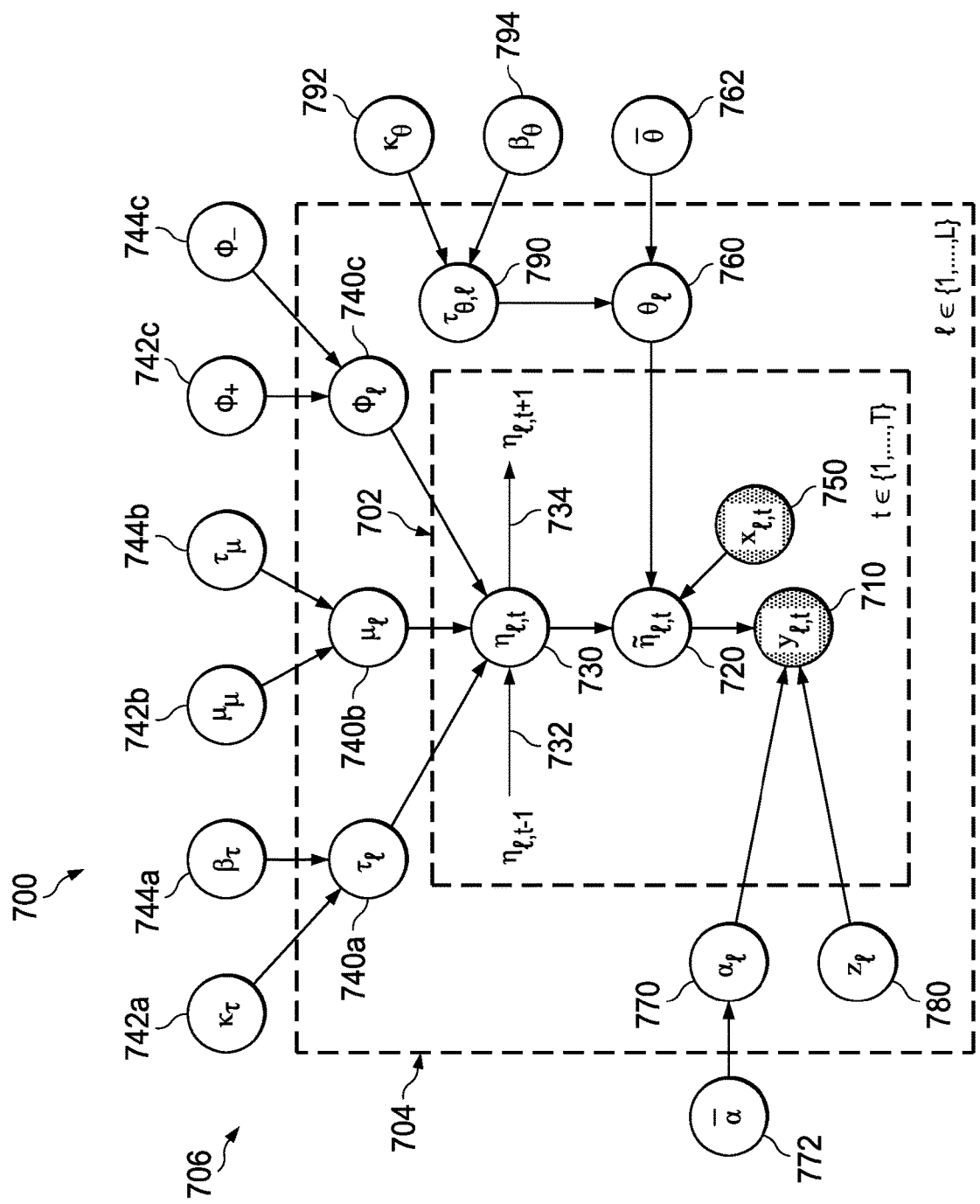
FIG. 7 illustrates an exemplary plate notation model of a latent process mean shifted by explanatory variables for multiple time series.

FIG. 7 illustrates a plate notation model for a latent process mean shifted by explanatory variables according to multiple time series. FIG. 7 generally follows similar notation to FIG. 5, however FIG. 7 incorporates two nested plates and a third level of notation that represents global parameters.

Plate notation model 700 comprises an inner plate 702 that indicates the repetition of variables inside inner plate 700. The plate notation model 700 further comprises a second plate 704 that indicates the repetition of variables inside the second plate 704. An outer area 706 outside the second plate 704 indicates the non-repetition of variables in outer area 706. Arrows of plate model 700 indicate dependency between variables. Plate notation indicates repetition of the model across multiple time periods t and multiple locations l, where variables inside inner plate 702 indicate changing values for each variable for each time period l and variables inside second plate 704 indicate changing values for each variable for each locations l.

Plate notation model 700 comprises an observed value $y_{l,t}$ 710, that is conditioned by an effective latent variable $\tilde{\eta}_{l,t}$ 720, which is, in turn, conditioned by a latent variable 730, explanatory variable 750, and regression coefficients 760. Latent variable 730 is conditioned by a prior latent variable 732 and one or more process parameters 740-740c. Latent variable 730 conditions a subsequent latent variable 734. Observed value 710 is likewise conditioned by size parameter 770 and zero-inflation parameter 780.

Plate notation model 700 further comprises a set of global parameters in outer area 706 that are constant across each time period t and location l. Local process parameter 740a is conditioned by global process parameters 742a and 744a; local process parameter 740b is conditioned by global process parameters 742b and 744b; and local process parameter 740c is conditioned by global process parameters 742c and 744c. Local regression coefficients 760 are conditioned by global regression coefficients 762. Local size parameter 770 is conditioned by global size parameter 772. Parameter 790 ($\tau_{l,t}$) represents the precision prior for local regression coefficients 760. Parameters 792 ($\kappa_\theta$) and 794 ($\beta_\theta$) represent respectively the shape and scale parameters of the gamma-distributed prior on Parameter 790.

According to some embodiments, the plate notation includes an initial and final latent log-intensity, but these are omitted from FIG. 7 solely for clarity of illustration. For example, observed value 710 represents unobserved values 330a-330b over the forecasting horizon and would therefore be unshaded, but this is omitted solely for clarity.

Although an observed value 710, an effective latent variable 720, a latent variable 730, a prior latent variable 732, a subsequent latent variable 734, one or more local process parameters 740-740, one or more global process parameters 742a-742c and 744a-744c, an explanatory variable 750, a local regression coefficient 760, a global regression coefficient 762, a local size parameter 770, a global size parameter 772, a zero-inflation parameter 780, precision parameter 790, shape parameter 792, and scale parameter 794 are shown and described, embodiments contemplate any number of observed values 710, effective latent variables 720, latent variables 730, prior latent variables 732, subsequent latent variables 734, local process parameters 740a-740c, global process parameters 742a-742c and 744a-744c, explanatory variables 750, local regression coefficients 760, global regression coefficients 762, local size parameters 770, global size parameters 772, zero-inflation parameter 780, precision parameter 790, shape parameter 792, and scale parameter 794 according to particular needs.

As can be seen with reference to FIG. 5, inner plate 702 of FIG. 7 appears facially similar. However, FIG. 7 comprises a second plate 704 indexed by the letter, l, which indicates location. According to some embodiments, this second plate 704 indexes over different locations, SKUs, or both, according to particular needs. Inner plate 702 indexes over time periods t within each time series. Therefore, each $y_{l,t}$ comprises an observed value 710 from historical data 222 at location l and time t. Each of these observed values 710 is generated by effective latent variable 720 $\tilde{\eta}_{l,t}$, which in turn is conditioned by latent variable 730 $\eta_{l,t}$, which corresponds to the latent variable 530 of FIG. 5 for a single time series. The effective latent variable 720 $\tilde{\eta}_{l,t}$ is conditioned not only by the latent variable 730, but also by the explanatory variables $x_{l,t}$ 750 which are known for each historical and future time period and location. Plate-notation model 700 receives the explanatory variables 224 and uses future explanatory variables factors (such as known future promotions, sales, special events, and/or weather, including weather forecasts) to calculate unknown variables. Explanatory variables $x_{l,t}$ 750 may be further combined with local coefficients 760 $\theta_l$, which is the response to the explanatory variables for the l-th time series. This response may take the form of a lift or a drop to the effective latent variable 720 at each time and location. The local coefficients $\theta_l$ 760 constitute a vector of the same length as explanatory variables $x_{l,t}$ 750, and give, for each element of the latter, the contribution that each element of the former should bring to the local shifting of $\eta_{l,t}$.

According to some embodiments, the shared prior across all time series is given by $\bar\theta$, which serves as joint prior for all $\theta_l$. According to an embodiment, $\theta_l$ allows explanatory variables for series l to be incorporated into the model by Equation 11:

$$\tilde{\eta}_{\ell,t} = \eta_{\ell,t} + x_{\ell,t}^l \theta_{\ell_1} \tag{11}$$

which is facially similar to Equation 3, but which incorporates location into the model. Local size parameter $\alpha_l$ 770 represents the tail size parameter for a negative binomial distribution. According to some embodiments, each time series comprises at least one local size parameter 770. Additionally, global size parameter $\bar\alpha$ 772 allows sharing of the tail size parameter across many different time series.

Zero-inflation parameter $z_l$ 780 is a coefficient of zero inflation, which modifies the negative binomial distribution to incorporate additional probability mass at zero in order to allow for excess zero demand observations to be accounted for.

Local process parameters 740a-740c are process specific parameters that control the AR(1) dynamical model by specifying the precision of the innovations (740a), the level of mean-reversion (740b) and speed of mean-reversion (740c).

Global process parameters 742a-742c and 744a-744c are shared across all plates and permit information sharing across different time series. Specifically the global process parameters 742a-742c and 744a-744c permit sharing across the variance of the noise for the latent process and other aspects of the model that may need to be shared across different time series.

According to some embodiments, the plate notation model of FIG. 7 illustrates a model with hierarchical structure where the outer plate indicates repetition across several time series, indexed by l, and information is shared across series by global hyperparameters located outside all plates, particularly the regression coefficient prior, $\bar\theta$.

To allow a group of L related time series to share information, supply chain planner 110 allows those parameters (for all time series $l \in \{1, \ldots, L\}$ that belong to the group being modeld simultaneously) share common parents, as illustrated in FIG. 7. A new plate iterates over the series-level parameters, which, according to one embodiment, inherit as follows from "global" variables shared across all time series:

$\alpha_l \sim \text{Exponential}(\bar\alpha)$, $\mu_l \sim t_{10}(\mu_\mu, \sigma_\mu)$, $\tau_l \sim \Gamma(\kappa_\tau, \beta_\tau)$, $\tau_{0,l} \sim \Gamma(\kappa_{0,\tau}, \beta_{0,\tau})$, $$\phi_l \sim \text{Beta}(\phi_+ + \phi_-, \phi_-),$$

$$\theta_l \sim \mathcal{N}(\bar{\theta}, \sigma_{\theta,l}^2 I),$$

$$\theta_{\theta,l} \sim \Gamma(\kappa_\theta, \beta_\theta), \qquad (12)$$

where Γ(a, b) represents the gamma distribution with shape parameter a and scale parameter b, and Beta(a, b) is the beta distribution with shape parameters a and b. The series-level parameters, variables in plate 1 of FIG. 7, all have the same meaning as previously, except that the l index makes them dependent on a specific time series. According to one embodiment, the hyperpriors that are used for the global parameters are:

$$\alpha \sim U(0.001, 0.1), \mu_\mu \sim \mathcal{N}(0, 2^2),$$

$$\tau_\mu \sim U(1,10), \kappa_\tau \sim U(5,10),$$

$$\beta_\tau \sim U(2,25), \kappa_{0,\tau} \sim U(1,5),$$

$$\beta_{0,\tau} \sim U(1,10), \kappa_\theta \sim U(5,10),$$

$$\beta_\theta \sim U(2,25), \phi_+ \sim U(1,600),$$

$$\phi_- \sim U(1,50), \bar{\theta} \sim \mathcal{N}(0,1), \qquad (13)$$

The latent dynamics of $\{\eta_l\}$ and the observation model are similar as in previous FIG. 5. For convenience, all global variables in FIG. 7 (except $\mu_\mu$) are represented by $\Theta_G = \{\alpha, \tau_\mu, \kappa_\tau, \beta_\tau, \kappa_{0,\tau}, \beta_{0,\tau}, \kappa_\theta, \beta_\theta, \phi_+, \phi_-, \bar{\theta}\}$, all series-l-variables (except $\mu_l$) by $\Theta_l = \{z_l, \alpha_l, \tau_l, \tau_{0,l}, \phi_l, \tau_{\theta,l}\}$, and all latents over which should be done inference by $\Theta = \Theta_G \cup \{\Theta_l\} \cup \{\mu_\mu, \mu_l, \eta_{l,t}\}$ And all series-l-variables as:

$$y_{l,t} \sim z_l \delta_0 + (1-z_l) \text{Neg. Bin.}(\exp(\tilde{\eta}_{l,t}), \alpha_l),$$

$$\tilde{\eta}_{l,t} = \eta_{l,t} + x_{l,t}' \theta_l,$$

$$\eta_{l,1} = \mu_l + \in_{l,1},$$

$$\eta_{l,t} = \mu_l + \phi_l(\eta_{l,t-1} - \mu_l) + \in_{l,t},$$

$$\in_{l,1} \sim \mathcal{N}(0, \Sigma_l^2 + \tau_{0,l}^2),$$

$$\in_{l,t} \sim \mathcal{N}(0, \tau_l^2), \qquad (14)$$

In an embodiment, this model is termed the hierarchical negative-binomial state space model for multiple time series.

Figure 8:
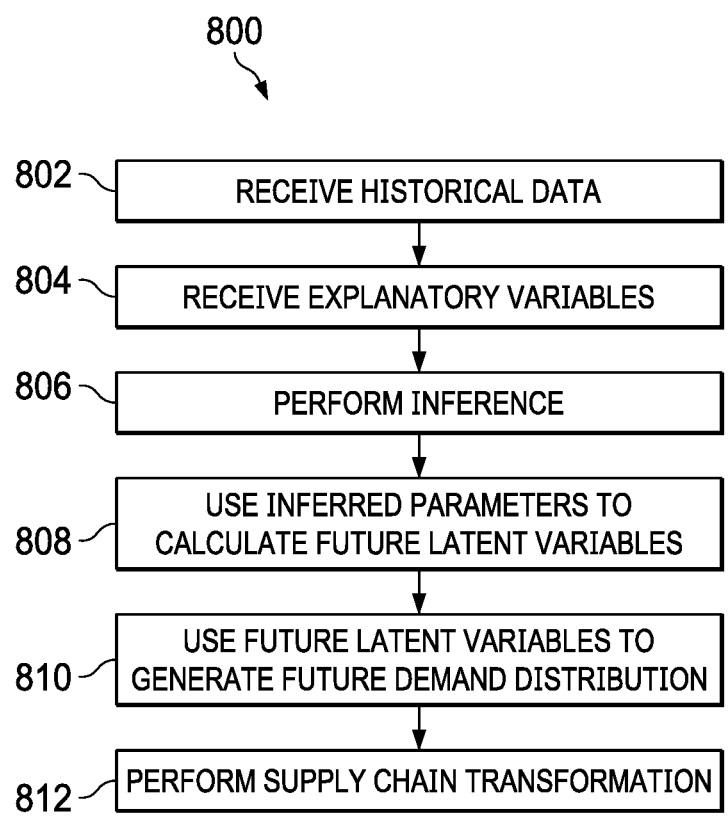
FIG. 8 illustrates an exemplary method of solving multiple time series with explanatory variables of the plate notation of FIG. 7.

FIG. 8 illustrates an exemplary method 800 for solving multiple time series with explanatory variables of the plate notation of FIG. 7. Method of solving multiple time series with explanatory variables proceeds by one or more activities, which although described in a particular order may be performed in one or more permutations, according to particular needs. The method begins at activity 802, where supply chain planner 110 receives observed values 710 for one or more time series of demand from historical data 222. At activity 804, supply chain planner receives explanatory variables 750.

At activity 806, supply chain planner 110 performs an inference over all unobserved supply chain model variables (clear nodes of FIG. 7). According to some embodiments, observed values 710 represent non-negative, integer observations of demand for one or more slow-movers. In addition, or as an alternative, the inference process generates values for all unobserved supply chain model variables (i.e. effective latent variables 720, latent variables 730, local process parameters 740a-740c, global process parameters 742a-742c and 744a-744c, local regression coefficients 760, global regression coefficients 762, local size parameter 770, global size parameter 772, zero-inflation parameter 780, precision parameter 790, shape parameter 792, and scale parameter 794.

According to some embodiments, supply chain planner 110 performs an inference by a Gaussian approximation of all latent variables belonging to Θ at their posterior mode, which yields near-optimal performance at extremely attractive computational cost compared to traditional methods. Accordingly, the computational efficiency is greatly improved by this model because important latent variables (such as $\{\mu_\mu, \mu_l, \eta_{l,t}\}$) have a conditionally normal prior; their posterior is nearly always close to normality despite the non-linear likelihood.

In order to perform inference, supply chain planner 110 utilizes a Laplace approximation by calculating the log-posterior probability up to an additive constant according to Equation 15:

$$\log P(\Theta|Y) = \log P(\Theta) + \log P(Y|\Theta) + C, \qquad (15)$$

where $Y = \{y_{l,t}\}_{t=1}^{T-h}$ is the set of all observed series values in all time series and C is an unknown and unimportant constant. The log-likelihood term log P (Y|Θ) is derived straightforwardly from the observation model (Equation 16):

$$y_t \sim z \delta_0 + (1-z) NB(\exp \tilde{\eta}_t, \alpha) \qquad (16)$$

along with the negative binomial probability distribution (Equation 17):

$$P_{NB}(y \mid \mu, \alpha) = \binom{\alpha + y - 1}{\alpha - 1} \left(\frac{\alpha}{\mu + \alpha}\right)^\alpha \left(\frac{\mu}{\mu + \alpha}\right)^y. \qquad (17)$$

The first term, the log-prior, decomposes into global-level, series-level, and observation-level terms:

$$\log P(\Theta) = \log P(\Theta_G) + \sum_{\ell=1}^{L} \log P(\Theta_\ell \mid \Theta_G) + \log P(\mu_\mu) + \sum_{\ell=1}^{L} \log P(\mu_\ell, \{\eta_{\ell,t}\} \mid \Theta_\ell, \mu_\mu). \qquad (18)$$

The second line of this equation expresses a prior over jointly normally-distributed variables with a highly structured and very sparse precision matrix, a Gaussian Markov random field.

For the multiple time series process, the hierarchical model gives rise to a conditional Gaussian Markov random field (GMRF) prior over the global level of mean-reversion $\mu_\mu$, the series-specific levels of mean reversion $\mu_l$, l=1, . . . , L, and the latent process log-means $\{\eta_{l,t}\}$. In the GMRF, a precision matrix constructed of the joint distribution over all variables is sparse and comprises a block diagonal structure, where each block corresponds to a single time series.

Based on this, supply chain planner 110 performs an optimization process, which determines the unobserved variables based on the maximization of Equation 15 over Θ. According to some embodiments, the optimization process comprises Quasi-Newton methods such as L-BFGS, however embodiments contemplate any suitable optimization process according to particular needs. Assuming that $\hat{\Theta}$ is the maximizing value and $\hat{\Sigma}$ is the inverse of $H_{\hat{\Theta}}$, which is the Hessian matrix of Equation 15 evaluated at $\hat{\Theta}$, the posterior distribution over $\Theta$ is jointly normal with mean $\hat{\Theta}$ and covariance matrix $\hat{\Sigma}$.

At activity 808, supply chain planner uses the determined unobserved supply chain model variables to obtain a distribution over future values of one or more latent variables, such as future latents 320e and 320f of FIG. 3. According to some embodiments, where the one or more observed values 710 comprise the measured demand of one or more slow-movers, the distributions over future values of one or more latent variables comprise a process log-mean distribution corresponding to the long run mean demand in log space.

From plate notation model 700 of FIG. 7 and the observation model of Equation 4, the predictive distribution over a future value $y_{l,t}$, $t \geq T-h+1$ depends only on the distribution of $\eta_{l,t}$, $\alpha_l$, and $z_l$, where T is the largest time index to be considered, and h is the forecasting horizon. In a supply chain planning context, the posterior uncertainty over $\alpha_l$, and $z_l$ is typically small and can be neglected.

At activity 810, supply chain planner 110 uses the determined distributions for the one or more forecasted latent variables to generate one or more forecasted values of demand. According to some embodiments, where the one or more observed values 710 comprise the measured demand of one or more slow-movers, the forecasted values of demand correspond to a forecasted distribution of probabilities of integer values of demand for one or more time steps into the future. For example, according to some embodiments, the supply chain planner outputs a probability distribution of one or more possible outcomes weighted by one or more probabilities that each outcome will occur.

From the observation model, the posterior distribution over $y_{l,t}$ can be obtained by integrating out $\tilde{\eta}_{l,t}$ according to:

$$P(y_{l,t}|Y) = \int_{-\infty}^{\infty} P(y_{l,t}|\exp \tilde{\eta}_{l,t}) P(\tilde{\eta}_{l,t}|Y) d\tilde{\eta}_{l,t} = P(y_{l,t}|\int_{-\infty}^{\infty} \exp \tilde{\eta}_{l,t} P(\tilde{\eta}_{l,t}|Y) d\tilde{\eta}_{l,t}), \quad (19)$$

wherein the summation property of negative binomials is utilized, viz. for IID variables $X_i \sim NB(\mu_i, \alpha)$, then $\Sigma_i X_i \sim NB(\Sigma_i \mu_i, \alpha)$, with the summation converging to an integral in the limit. Accordingly, supply chain planner 110 calculates the posterior expectation of $\exp \tilde{\eta}_{l,t}$ from:

$$\mathbb{E}[\exp \tilde{\eta}_{l,t}|Y] = \exp(\mathbb{E}[\tilde{\eta}_{l,t}|Y] + \tfrac{1}{2} \mathrm{Var}[\tilde{\eta}_{l,t}|Y]), \quad (20)$$

since $\tilde{\eta}_{l,t}$ has a normal posterior under the Laplace approximation, and from Equation 3:

$$\mathbb{E}[\tilde{\eta}_{l,t}|Y] = \mathbb{E}[\eta_{l,t}|Y] + x_{l,t}' \mathbb{E}[\theta_l|Y], \quad (21)$$

where the conditional posteriors for $\tilde{\eta}_{l,t}$ and $\theta_l$ are directly available in $\hat{\Theta}$. Similarly, the posterior variance for $\tilde{\eta}_{l,t}$ is:

$$\mathrm{Var}[\tilde{\eta}_{l,t}|Y] = \mathrm{Var}[\eta_{l,t}|Y] + x_{l,t}' \mathrm{Var}[\theta_l|Y] x_{l,t} + 2 x_{l,t}' \mathrm{Cov}[\eta_{l,t}, \theta_l|Y] \quad (22)$$

where variances and covariances on the right hand side are taken from $\hat{\Sigma}$. At activity 812, the supply chain planner performs a supply chain transformation by, for example, adjusting one or more product mix ratios, inventory levels at various stocking points, and proportional or alternative sourcing of one or more supply chain entities 120 based, at least in part, on the demand forecast. As explained above, supply chain planner 110 according to some embodiments performs the supply chain transformation based on the demand forecast and one or more business constraints, bounds, coefficients, changes, order of operations, goals, objectives, and the like of one or more supply chain entities. According to some embodiments, the business constraints, goals and objectives of one or more supply chain entities 120 may include, but are not limited to, meeting various types of demand, adhering to product mix or safety stock limits, minimizing inventory, maintaining specific material or capacity, utilizing particular resources, maintaining proportional sourcing, reducing use of alternate materials, optimizing profit, and the like.

In addition, although, FIG. 8 illustrates one embodiment of a method 800 of solving multiple time series with explanatory variables of plate notation model 700 of supply chain network 100, various changes may be made to method 800 without departing from the scope of embodiments of the present invention.

Figure 9:
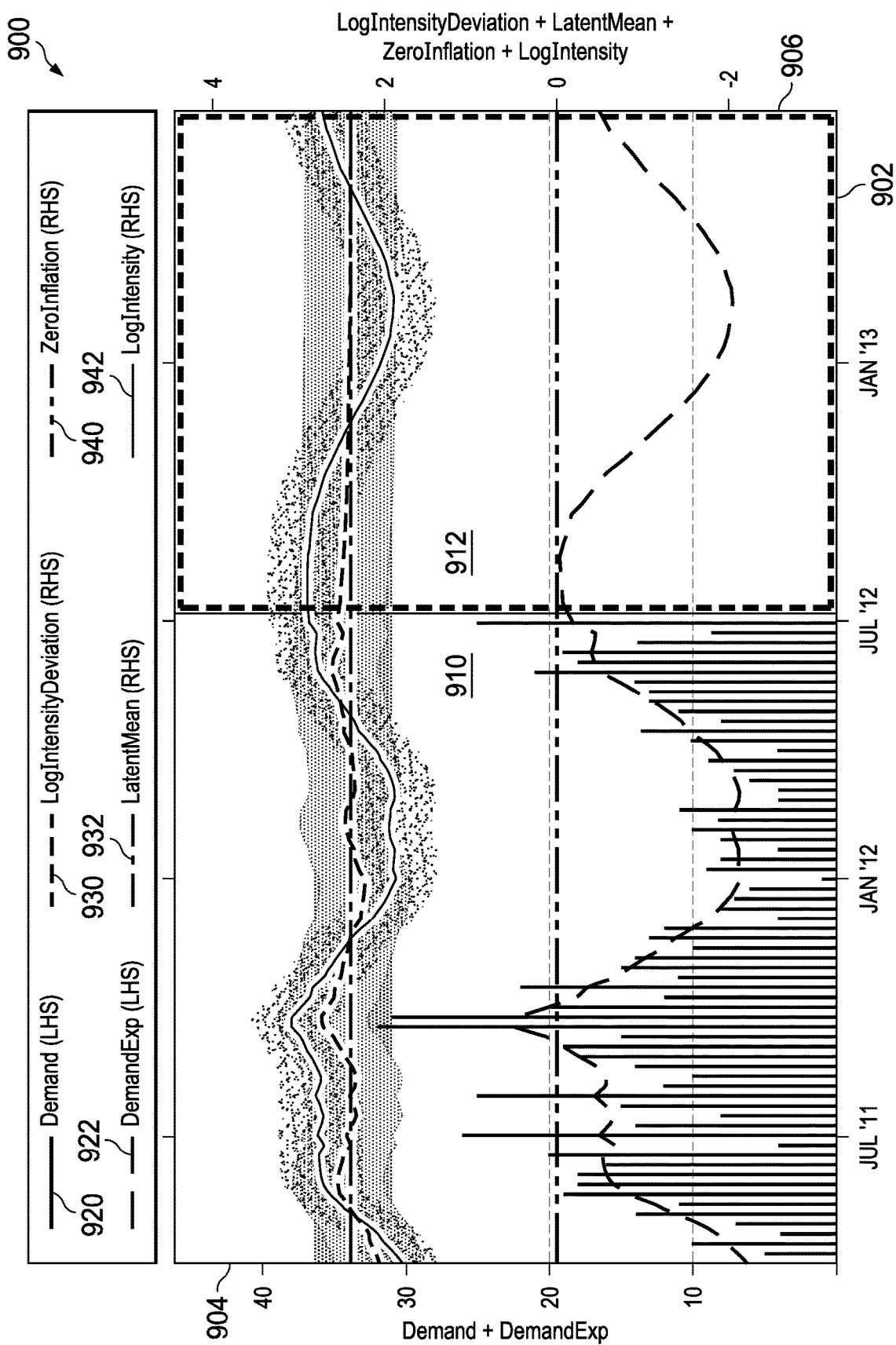
FIG. 9 illustrates an exemplary graph of a slow-moving product according to a single time series.
Figure 10:
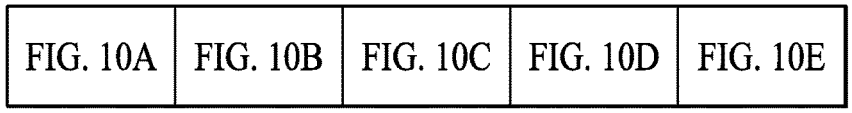
FIGS. 10A-E illustrate an exemplary graph of a slow-moving product according to multiple time series.
Figure 10A:
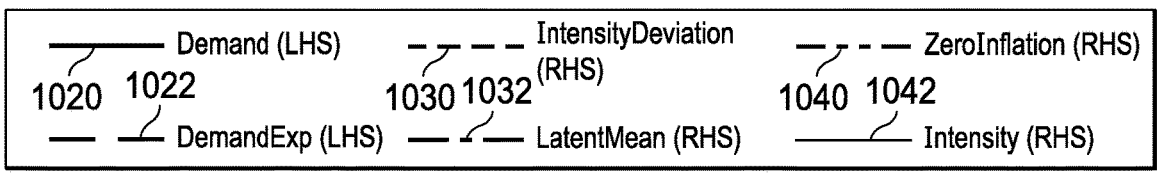
Figure 10A:
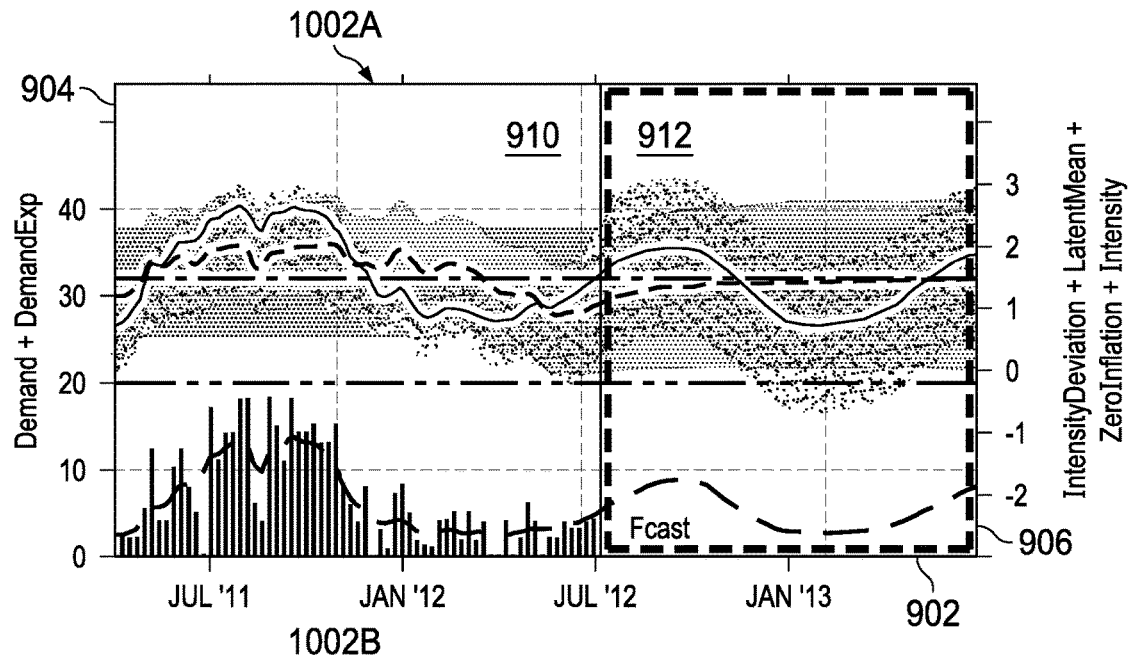
Figure 10A:
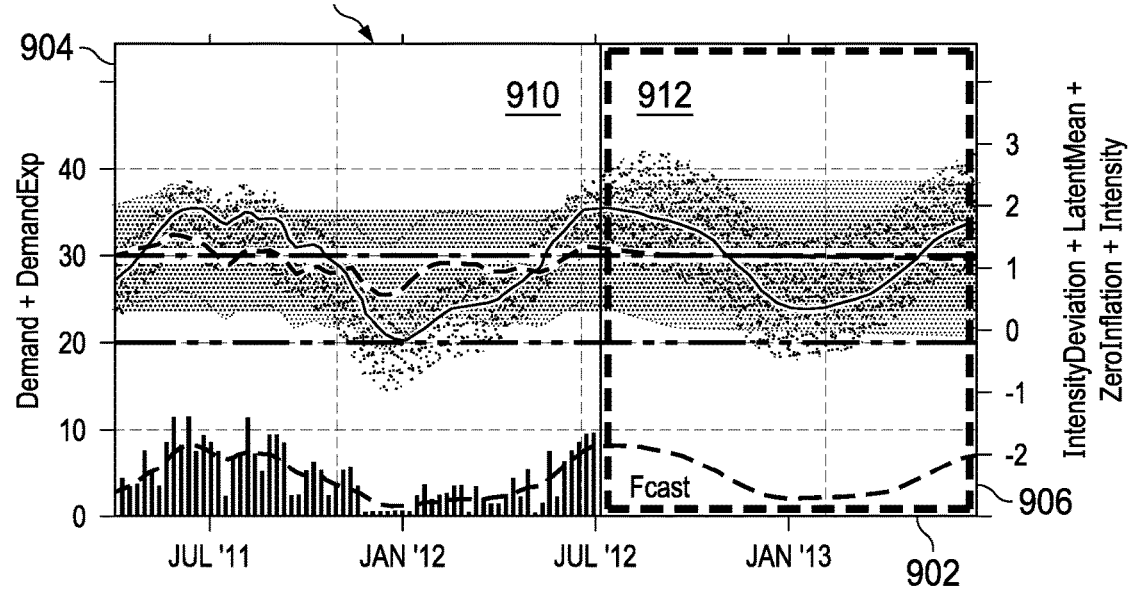
Figure 10B:
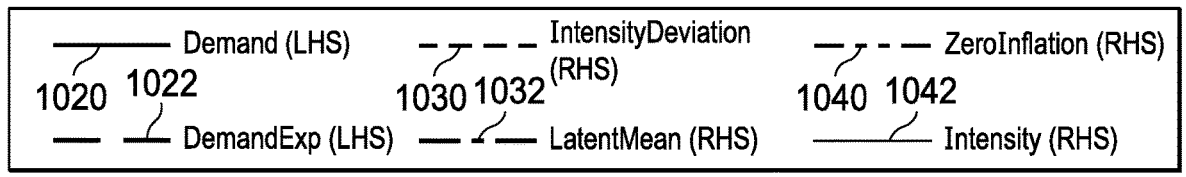
Figure 10B:
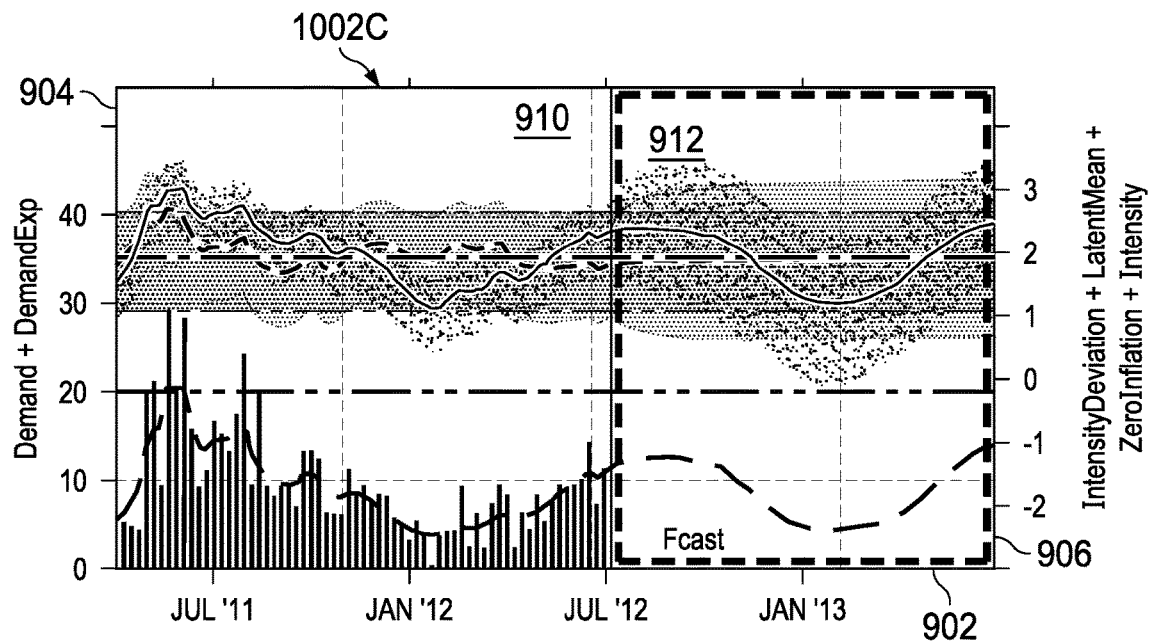
Figure 10B:
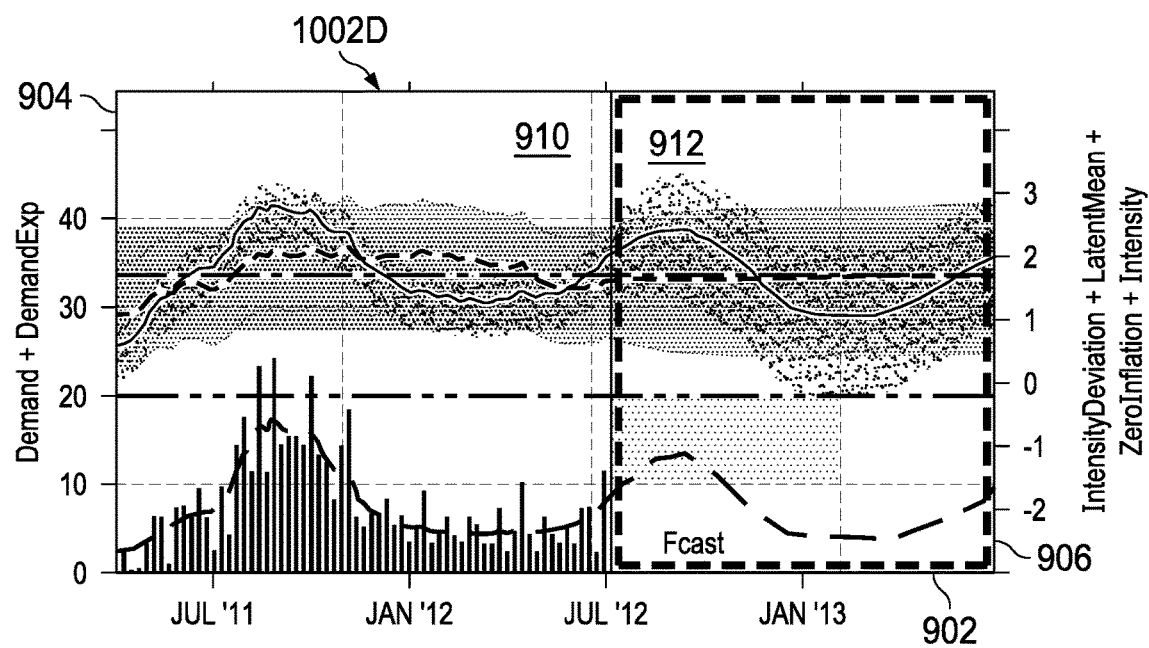
Figure 10C:
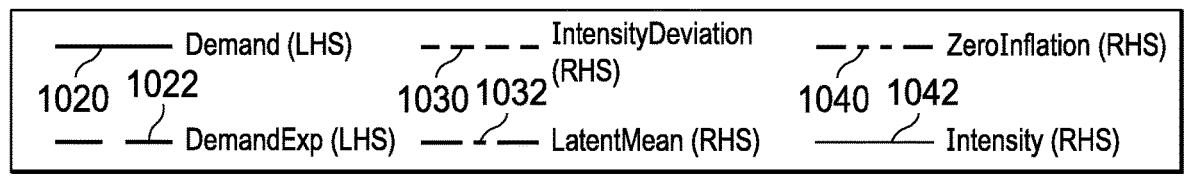
Figure 10C:
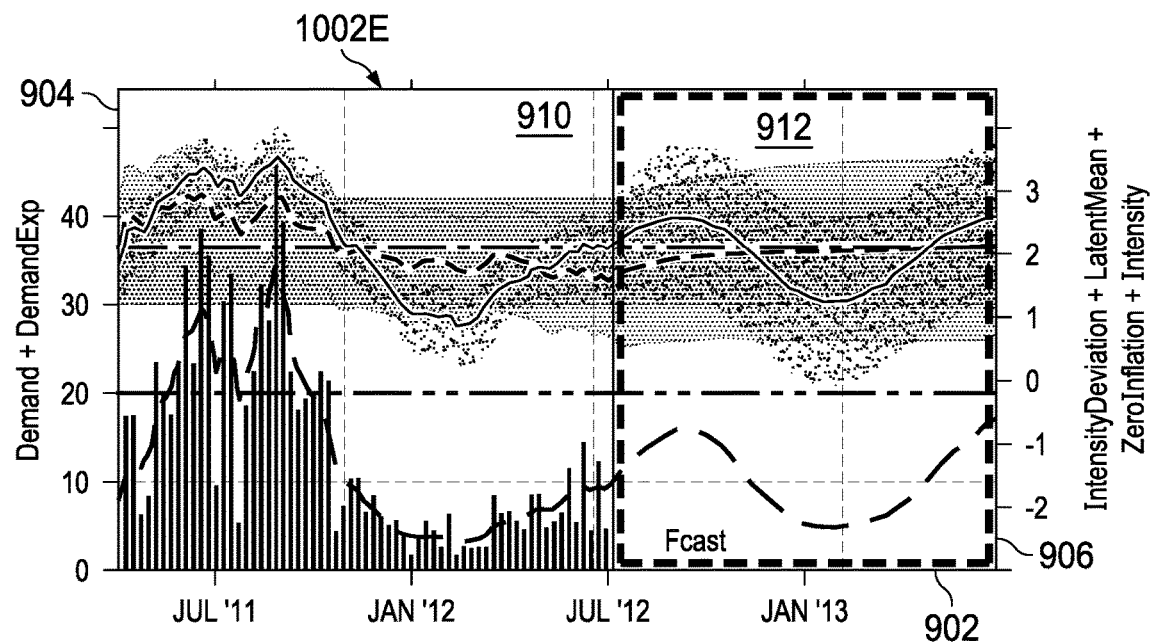
Figure 10C:
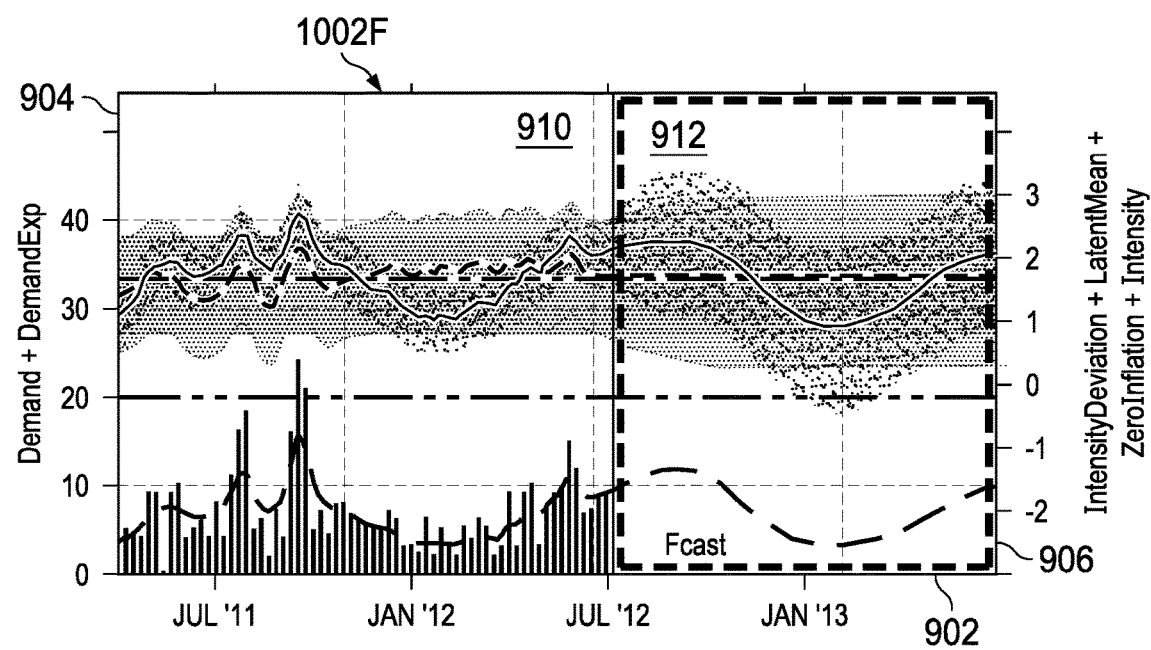
Figure 10D:
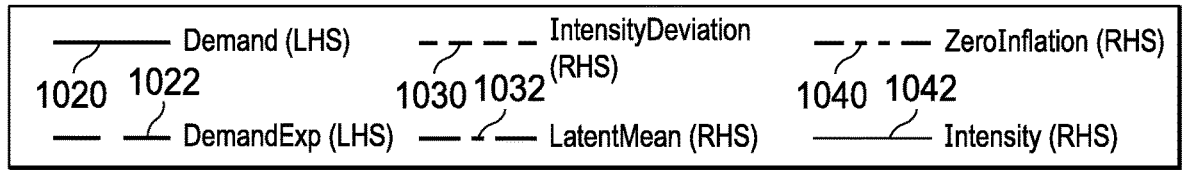
Figure 10D:
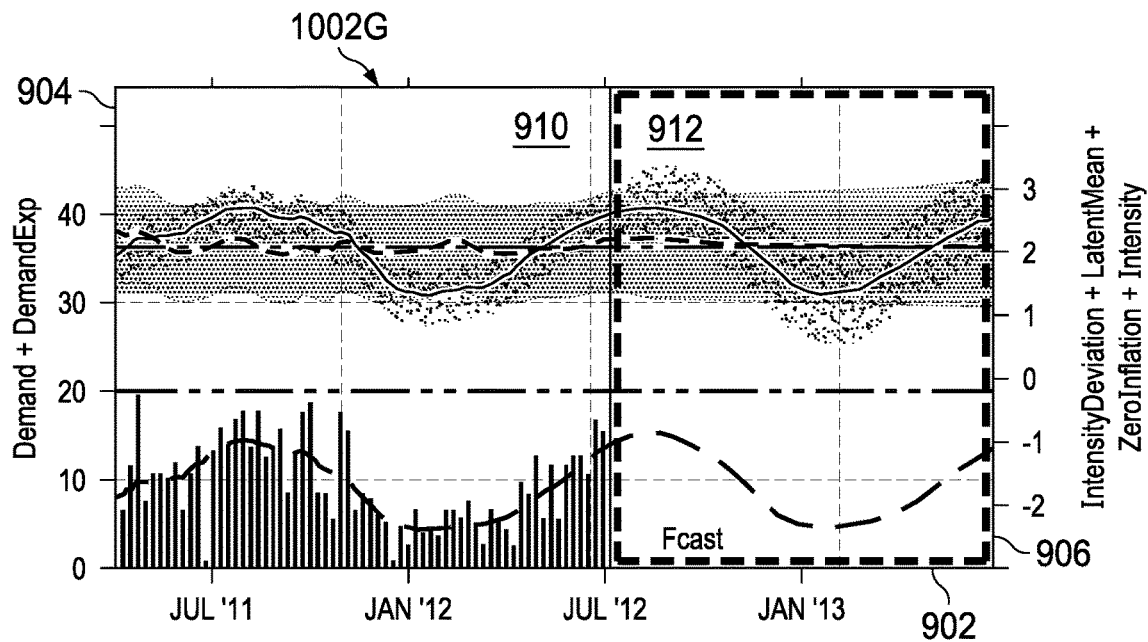
Figure 10D:
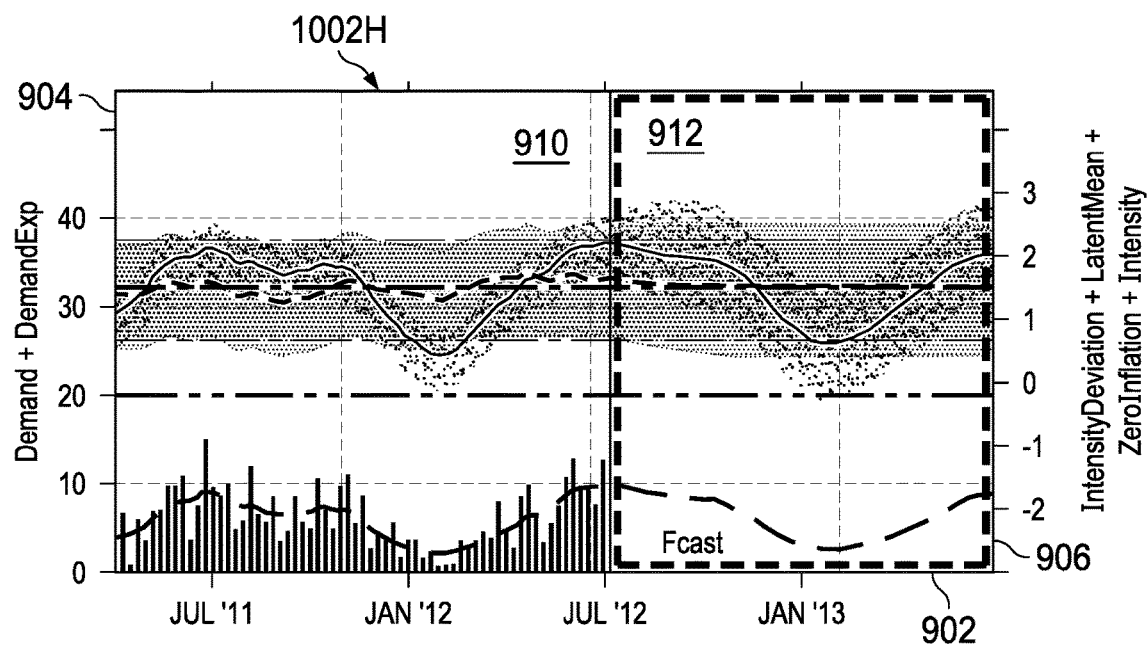
Figure 10E:
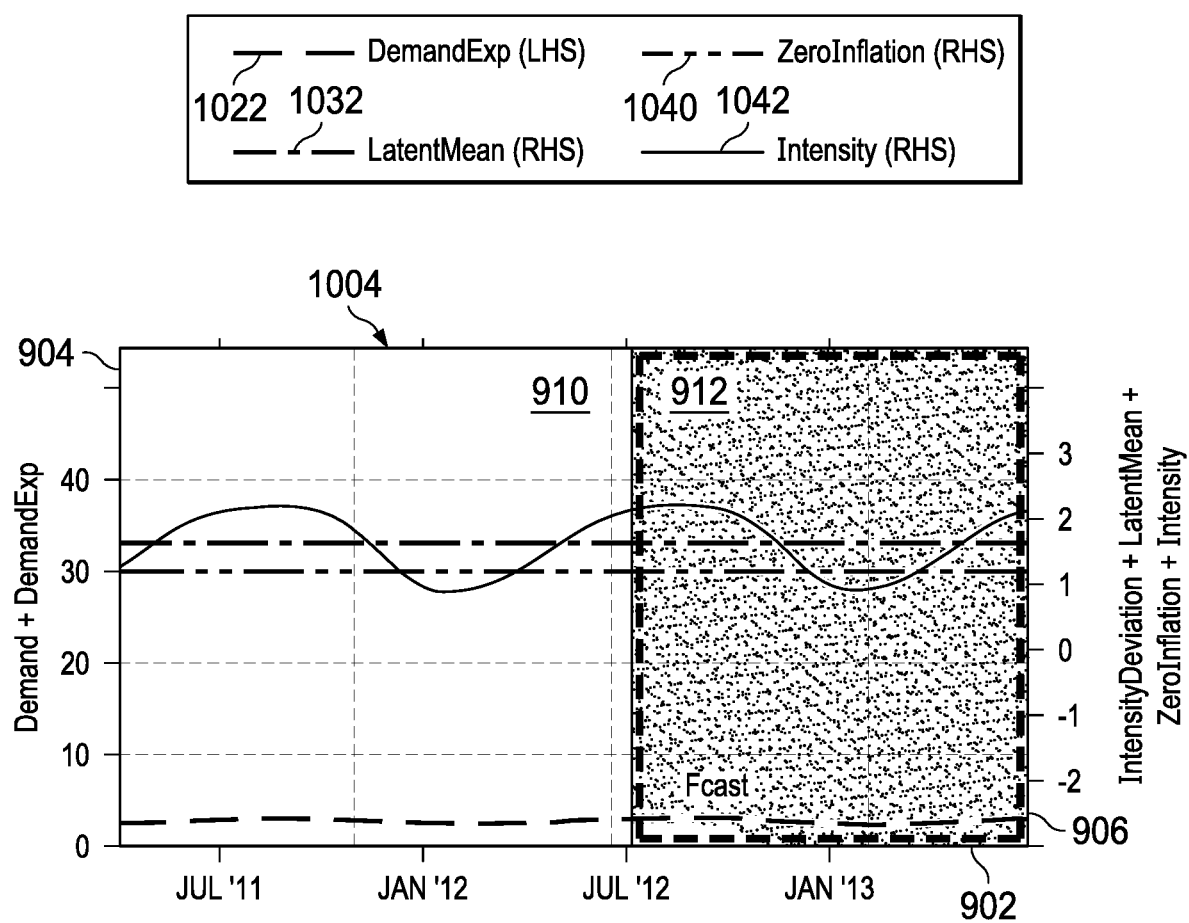

FIG. 9 illustrates an exemplary graph of historical data 222 and forecast data 228 according to method 600. As indicated, during the optimization process, supply chain planner 110 calculates unknown variables substantially in a single calculating process. For example, supply chain planner 110 may generate a graph 900 with three axes: time 902, quantity scale 904, and a log-quantity scale 906.

Graph 900 illustrates the sale of a particular brand of bug spray at a big-box retailer from early 2011 to July 2012. Graph 900 comprises a first half corresponding to the left hand side (LHS) 910, or historical data 222, and a second half corresponding to the right hand side (RHS) 912, or forecasted data. In the LHS 910, observed values $y_t$ 510 are shown for a past demand 920.

As described above, supply chain planner 110 receives the observed values and forecasts the demand into the future according to inference and optimization. In addition, supply chain planner 110 generates the data that appears in the upper portion of the graph (shown in log-space). For example, latent mean 932, corresponds to process parameter $\mu$ 540b, which is also known as the long run mean. As can be seen in graph 900, confidence bands corresponding to 95% confidence surround the mean across the graph.

Supply chain planner 110 generates LogIntensityDeviation 930 and LogIntensitity 942 by the inference process. LogIntensityDeviation 930 corresponds to the latent variables 730 $\eta_{l,t}$, and LogIntensity 942 corresponds to variables 720 $\tilde{\eta}_{l,t}$. LogIntensity 942 on the LHS 910 corresponds to the inferred latent log of expected demand. LogIntensity 942 on the RHS 912 corresponds to the forecasted latent log of expected demand.

LogIntensityDeviation 930 reverts to the level of the latent mean 932 over time. The speed of the mean reversion corresponds to process parameter $\phi$ 540c, known as the speed of mean reversion. According to embodiments, process parameters 540c takes a value between 0 and 1. Values nearer to 1, such as 0.999, indicate that LogIntensity 942 will revert to the latent mean 932 very slowly over time. Values closer to 0, such as 0.001, indicate that LogIntensity 942 will reverts to latent mean 932 very quickly.

Similar to the above, confidence bands corresponding to 95% confidence surround LogIntensity 942 across the chart. process parameter $\tau$ 540a is related to the width of the confidence bands around the LogIntensity 942; the widths which are calculated according to the inverse Hessian matrix, as described in Equation 22.

After supply chain planner 110 generates the LogIntensity 942 and calculates the process parameters according to the inference process, supply chain planner 110 generates the demand distribution for one or more forecasted values 330a-330b according to the zero-inflated negative-binomial expression of Equation 3. DemandExp 922, corresponds to the mean expected demand under the model distribution, or the average of what the model predicts the demand distribution will be according to plate notation model 500.

Additionally, supply chain planner 110 accounts for explanatory variables in the calculation of the expected demand. LogIntensityDeviation 930 corresponds to the demand absent any effects from explanatory variables. For example, the Bug Spray illustrated on graph 900, illustrates that sales will go up according to seasonal factors, which cause more bugs to be present or people to spend more time outdoors. According to plate notation model 500, we can see that, as the forecasting of LogIntensity 942 is pushed into the future, LogIntensity 942 matches the cyclical seasonality according to the historical demand. This is contrasted with LogIntensityDeviation 930, which quickly reverts, exponentially, to LatentMean 932 and does demonstrate this effect of seasonality. Supply chain planner 110 accomplishes this strong response to seasonality by relatively strong priors on the smoothness of the seasonal effect. The response is then carried forward to the demand distribution, whose mean is given by DemandExp 922. According to some embodiments, plate notation model 500, which is represented in FIG. 9 takes into account a single store location. According to some embodiments, plate notation model 700, which is discussed below and represented in FIGS. 10A-E permits sharing across multiple store locations.

FIGS. 10A-E illustrate a graph of multiple time series demand forecasts according to method 800. Graph 1000 comprises charts of eight stores (1002a-1002h) selling bug spray from early 2011 to July 2012 and one store (1004) which is not open, but for which the model predicts demand. The three axes representing time 902, quantity scale 904, and a log-quantity scale 906 and LHS 910 and RHS 912 are the same as in FIG. 9.

According to plate notation model 700, supply chain planner 110 shares information across SKUs by incorporating explanatory variables 750 and global process parameters 742a-742c and 744a-744c. In one embodiment, supply chain planner 110 generates a latent demand curve for each store 1002a-1002h. The latent demand curve, Intensity 1042, is generated according to the process outlined in regards to FIG. 9. Each store, 1002a-1002h will have its own latent demand curve which takes into account explanatory variables 750, which are specific to each store, such as particular local special events or seasonalities, which are location dependent.

Next, supply chain planner 110 shares information across various stores 1002a-1002h, which permits a better prediction for each store weighted against the observed values 710 stored in historical data 222 for each store, or a prediction for a store with no historical data 222 or observed values 710, such as store 1004. For example, store 1002a may have a promotion and will specify the strength of the promotion effect. This information will be shared according to a common prior with a second store, such as store 1002b. Each of these will go into a variable called global regression coefficient 762.

According to some embodiments, the global regression coefficient 762 corresponds to the value of $\theta_j$, the local regression coefficient 760, in the absence of further information. For example, stores with many observed values 710, such as stores 1002a-1002h will have a local regression coefficient 760 closer to a specific local value, whereas stores with little or no observed values 710, such as store 1004, will have a local regression coefficient 760 much closer to the global regression coefficient 762. Therefore, the pooling effect and the borrowing effect of plate notation model 700 depends on the amount of data available for each store. By way of example only and not by limitation, assuming that a particular store sells surfboards and the store is planning a spring break promotion for surfboards. Plate notation model 700 permits predicting the rate of sales increase for any store based on the global regression coefficient 762. The supply chain planner 110 can use stores with similar demographics to encode the global regression coefficient 762 to predict the sales at a store with little or no historical data of surfboard promotions.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
a computer comprising a memory and a processor and configured to:
   model a supply chain comprising one or more supply chain entities and a supply chain inventory comprising one or more supply chain products;
   receive historical sales data comprising at least two demand time series and explanatory variables for a plurality of past time periods;
   model observed values of the at least two demand time series according to a hierarchical negative-binomial state space model, wherein the observed values are conditioned by an effective latent variable, wherein the effective latent variable is conditioned by a latent variable and an explanatory variable of the received explanatory variables, and the latent variable is conditioned by a prior latent variable and local process parameters;
   model a set of global parameters that are constant at each of the plurality of past time periods and each location, wherein the set of global parameters comprise global process parameters that condition the local process parameters;
   perform inference using a Gaussian Markov Random Field and a sparse tridiagonal precision matrix over a time series of unobserved supply chain model variables to generate the local and global process parameters, the latent variable, and the effective latent variable, wherein the use of the sparse tridiagonal precision matrix increases the computing speed of computing a prior term in the time series;
   generate forecasted latent variables based on the generated inferred local and global process parameters, latent variable, and effective latent variable, wherein the forecasted latent variables are generated as a forecasted latent log of expected demand based on observed values of demand for the one or more supply chain products;
   generate a distributional demand forecast comprising probabilities of integer values of demand for one or more time steps into the future based, at least in part, on the forecasted latent variables;
   in response to a current time period elapsing to become one of the plurality of past time periods, repeating the receiving historical data, modelling, performing inference and generating forecasting steps based on the actual sales data corresponding to the elapsed current time period being added to the historical sales data; and in response to the generated distributional demand forecast, transform the supply chain inventory to a level based on the distributional demand forecast.

2. The system of claim 1, wherein the computer performs inference by using a Laplace approximation.

3. The system of claim 2, wherein the one or more supply chain products are slow-movers.

4. The system of claim 3, wherein historical sales data comprises multiple time series with the forecasted latent log of expected demand modified by transforming explanatory variables using local regression coefficients, wherein the local regression coefficients are conditioned by global regression coefficients.

5. The system of claim 4, wherein the future demand distribution comprises a negative binomial distribution with a zero-inflation weighting factor.

6. The system of claim 5, further comprising:
the computer is further configured to:
determine one or more inventory policy parameters based, at least in part, on the distributional demand forecast and a service level; and
generate a replenishment order according to one or more replenishment rules; and
a supplier ships one or more products based, at least in part, on the replenishment order.

7. A computer-implemented method, comprising:
modeling, by a computer comprising a memory and a processor, a supply chain comprising one or more supply chain entities and a supply chain inventory comprising one or more supply chain products;
receiving, by the computer, historical sales data comprising at least two demand time series and explanatory variables for a plurality of past time periods;
modeling, by the computer, observed values of the at least two demand time series according to a hierarchical negative-binomial state space model, wherein the observed values are conditioned by an effective latent variable, wherein the effective latent variable is conditioned by a latent variable and an explanatory variable of the received explanatory variables, and the latent variable is conditioned by a prior latent variable and local process parameters;
modeling, by the computer, a set of global parameters that are constant at each of the plurality of past time periods and each location, wherein the set of global parameters comprise global process parameters that condition the local process parameters;
performing, by the computer, inference using a Gaussian Markov Random Field and a sparse tridiagonal precision matrix over a time series of unobserved supply chain model variables to generate the local and global process parameters, the latent variable, and effective latent variable, wherein the use of the sparse tridiagonal precision matrix increases the computing speed of computing a prior term in the time series;
generating, by the computer, forecasted latent variables based, at least in part, on the generated inferred local and global process parameters, latent variable, and effective latent variable, wherein the forecasted latent variables are generated as a forecasted latent log of expected demand based on observed values of demand for the one or more supply chain products;
generating, by the computer, a distributional demand forecast comprising probabilities of integer values of demand for one or more time steps into the future based, at least in part, on the forecasted latent variables;
in response to a current time period elapsing to become one of the plurality of past time periods, repeating the receiving historical data, modelling, performing inference and generating forecasting steps based on the actual sales data corresponding to the elapsed current time period being added to the historical sales data; and
transforming, in response to the generated distributional demand forecast, the supply chain inventory to a level based on the distributional demand forecast.

8. The method of claim 7, wherein the computer performs inference by using a Laplace approximation.

9. The method of claim 8, wherein the one or more supply chain products are slow-movers.

10. The method of claim 9, wherein historical sales data comprises multiple time series with the forecasted latent log of expected demand modified by transforming explanatory variables using local regression coefficients, wherein the local regression coefficients are conditioned by global regression coefficients.

11. The method of claim 10, wherein the future demand distribution comprises a negative binomial distribution with a zero-inflation weighting factor.

12. The method of claim 11, further comprising:
determining, by the computer, one or more inventory policy parameters based, at least in part, on the distributional demand forecast and a service level;
generating, by the computer, a replenishment order according to one or more replenishment rules; and
shipping, by a supplier, one or more products based, at least in part, on the replenishment order.

13. A non-transitory computer-readable medium embodied with software, the software when executed configured to:
model a supply chain comprising one or more supply chain entities and a supply chain inventory comprising one or more supply chain products;
receive historical sales data comprising at least two demand time series and explanatory variables for a plurality of past time periods;
model observed values of the at least two demand time series according to a hierarchical negative-binomial state space model, wherein the observed values are conditioned by an effective latent variable, wherein the effective latent variable is conditioned by a latent variable and an explanatory variable of the received explanatory variables, and the latent variable is conditioned by a prior latent variable and local process parameters;
model a set of global parameters that are constant at each of the plurality of past time periods and each location, wherein the set of global parameters comprise global process parameters that condition the local process parameters;
perform inference using a Gaussian Markov Random Field and a sparse tridiagonal precision matrix over a time series of unobserved supply chain model variables to generate the local and global process parameters, the latent variable, and the effective latent variable, wherein the use of the sparse tridiagonal precision matrix increases the computing speed of computing a prior term in the time series;
generate forecasted latent variables based, at least in part, on the generated inferred local and global process parameters, latent variable, and effective latent variable, wherein the forecasted latent variables are generated as a forecasted latent log of expected demand based on observed values of demand for the one or more supply chain products;

generate a distributional demand forecast comprising probabilities of integer values of demand for one or more time steps into the future based, at least in part, on the forecasted latent variables;

in response to a current time period elapsing to become one of the plurality of past time periods, repeat the receiving historical data, modelling, performing inference and generating forecasting steps based on the actual sales data corresponding to the elapsed current time period being added to the historical sales data; and transform in response to the generated distributional demand forecast, the supply chain inventory to a level based on the distributional demand forecast.

14. The non-transitory computer-readable medium of claim 13, wherein the software performs inference by using a Laplace approximation.

15. The non-transitory computer-readable medium of claim 14, wherein the one or more supply chain products are slow-movers.

16. The non-transitory computer-readable medium of claim 15, wherein historical sales data comprises multiple time series with the forecasted latent log of expected demand modified by transforming explanatory variables using local regression coefficients, wherein the local regression coefficients are conditioned by global regression coefficients.

17. The non-transitory computer-readable medium of claim 16, wherein the future demand distribution comprises a negative binomial distribution with a zero-inflation weighting factor.

* * * * *